(12) United States Patent
Zeng et al.

(10) Patent No.: US 11,765,046 B1
(45) Date of Patent: Sep. 19, 2023

(54) ENDPOINT CLUSTER ASSIGNMENT AND QUERY GENERATION

(71) Applicant: Cisco Technology, Inc., San Jose, CA (US)

(72) Inventors: Weifei Zeng, Sunnyvale, CA (US); Omid Madani, San Carlos, CA (US); Varun Malhotra, Sunnyvale, CA (US); Paul Mach, Oakland, CA (US); Yash Vipul Doshi, Sunnyvale, CA (US); Sayeed Mohammed Tasnim, Sunnyvale, CA (US); Thanh Nhan Thi Nguyen, Los Altos, CA (US); Navindra Yadav, Cupertino, CA (US); Shashi Gandham, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 455 days.

(21) Appl. No.: 16/188,979

(22) Filed: Nov. 13, 2018

Related U.S. Application Data

(60) Provisional application No. 62/616,347, filed on Jan. 11, 2018.

(51) Int. Cl.
*H04L 41/16* (2022.01)
*H04L 41/0893* (2022.01)
(Continued)

(52) U.S. Cl.
CPC ............ *H04L 41/16* (2013.01); *G06F 16/9532* (2019.01); *G06N 20/00* (2019.01); *H04L 41/0893* (2013.01)

(58) Field of Classification Search
CPC ...... H04L 41/16; G06F 16/9532; G06N 20/00; H04L 41/0893
See application file for complete search history.

(56) References Cited

U.S. PATENT DOCUMENTS

| | | | |
|---|---|---|---|
| 5,742,829 | A | 4/1998 | Davis et al. |
| 5,903,545 | A | 5/1999 | Sabourin et al. |

(Continued)

FOREIGN PATENT DOCUMENTS

| | | | |
|---|---|---|---|
| CN | 101093452 | A | 12/2007 |
| CN | 101770551 | A | 7/2010 |

(Continued)

OTHER PUBLICATIONS

"Application Discovery Manager User's Guide," VMWare, Inc. pp. 1-74.

(Continued)

*Primary Examiner* — John A Follansbee
*Assistant Examiner* — Fadi Haj Said
(74) *Attorney, Agent, or Firm* — Polsinelli

(57) ABSTRACT

This disclosure provides solutions for automatically grouping network devices (e.g., endpoints) into clusters based on device characteristics. In some aspects, the disclosed technology also provides solutions for generating user selectable queries based on cluster characteristics. A process of the disclosed technology can include steps for identifying one or more device characteristics associated with a first network device, identifying one or more cluster characteristics for each of a first cluster and a second cluster, and comparing the device characteristics associated with the first network device with the one or more cluster characteristics for the first cluster and the second cluster. The process can further include steps for adding the first network device to the first cluster based on the cluster characteristics for the first cluster and the device characteristics for the first network device. Systems and machine-readable media are also provided.

20 Claims, 5 Drawing Sheets

(51) Int. Cl.
*G06N 20/00* (2019.01)
*G06F 16/9532* (2019.01)

(56) References Cited

U.S. PATENT DOCUMENTS

| | | | |
|---|---|---|---|
| 6,012,096 A | 1/2000 | Link et al. |
| 6,144,962 A | 11/2000 | Weinberg et al. |
| 6,247,058 B1 | 6/2001 | Miller et al. |
| 6,330,562 B1 | 12/2001 | Boden et al. |
| 6,525,658 B2 | 2/2003 | Streetman et al. |
| 6,597,663 B1 | 7/2003 | Rekhter |
| 6,611,896 B1 | 8/2003 | Mason, Jr. et al. |
| 6,728,779 B1 | 4/2004 | Griffin et al. |
| 6,801,878 B1 | 10/2004 | Hintz et al. |
| 6,847,993 B1 | 1/2005 | Novaes et al. |
| 6,925,490 B1 | 8/2005 | Novaes et al. |
| 6,958,998 B2 | 10/2005 | Shorey |
| 6,983,323 B2 | 1/2006 | Cantrell et al. |
| 6,996,817 B2 | 2/2006 | Birum et al. |
| 7,002,464 B2 | 2/2006 | Bruemmer et al. |
| 7,096,368 B2 | 8/2006 | Kouznetsov et al. |
| 7,120,934 B2 | 10/2006 | Ishikawa |
| 7,162,643 B1 | 1/2007 | Sankaran et al. |
| 7,181,769 B1 | 2/2007 | Keanini et al. |
| 7,185,103 B1 | 2/2007 | Jain |
| 7,240,106 B2* | 7/2007 | Cochran et al. ... H04L 29/12009 709/220 |
| 7,337,206 B1 | 2/2008 | Wen et al. |
| 7,353,511 B1 | 4/2008 | Ziese |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,466,681 B2 | 12/2008 | Ashwood-Smith et al. |
| 7,467,205 B1 | 12/2008 | Dempster et al. |
| 7,496,040 B2 | 2/2009 | Seo |
| 7,496,575 B2 | 2/2009 | Buccella et al. |
| 7,530,105 B2 | 5/2009 | Gilbert et al. |
| 7,610,330 B1 | 10/2009 | Quinn et al. |
| 7,633,942 B2 | 12/2009 | Bearden et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,752,307 B2 | 7/2010 | Takara |
| 7,774,498 B1 | 8/2010 | Kraemer et al. |
| 7,783,457 B2 | 8/2010 | Cunningham |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |
| 7,873,025 B2 | 1/2011 | Patel et al. |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,056,134 B1 | 11/2011 | Ogilvie |
| 8,135,657 B2 | 3/2012 | Kapoor et al. |
| 8,156,430 B2 | 4/2012 | Newman |
| 8,181,248 B2 | 5/2012 | Oh et al. |
| 8,185,824 B1 | 5/2012 | Mitchell et al. |
| 8,224,971 B1* | 7/2012 | Miller et al. ... H04L 12/4641 370/254 |
| 8,234,660 B2* | 7/2012 | Ari et al. ... H04L 41/20 709/201 |
| 8,250,657 B1 | 8/2012 | Nachenberg et al. |
| 8,255,972 B2 | 8/2012 | Azagury et al. |
| 8,260,840 B1* | 9/2012 | Sirota et al. ... G06F 9/5061 709/201 |
| 8,266,697 B2 | 9/2012 | Coffman et al. |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,365,286 B2 | 1/2013 | Poston |
| 8,370,407 B1 | 2/2013 | Devarajan et al. |
| 8,381,289 B1 | 2/2013 | Pereira et al. |
| 8,391,270 B2 | 3/2013 | Van Der Stok et al. |
| 8,407,164 B2 | 3/2013 | Malik et al. |
| 8,413,235 B1 | 4/2013 | Chen et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,489,765 B2 | 7/2013 | Vasseur et al. |
| 8,516,590 B1 | 8/2013 | Ranadive et al. |
| 8,527,977 B1 | 9/2013 | Cheng et al. |
| 8,549,635 B2 | 10/2013 | Muttik et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,572,739 B1 | 10/2013 | Cruz et al. |
| 8,588,081 B2 | 11/2013 | Salam et al. |
| 8,600,726 B1 | 12/2013 | Varshney et al. |
| 8,613,084 B2 | 12/2013 | Dalcher |
| 8,630,316 B2 | 1/2014 | Haba |
| 8,631,464 B2 | 1/2014 | Belakhdar et al. |
| 8,640,086 B2 | 1/2014 | Bonev et al. |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,683,554 B2 | 3/2014 | Martin et al. |
| 8,706,914 B2 | 4/2014 | Duchesneau |
| 8,713,676 B2 | 4/2014 | Pandrangi et al. |
| 8,719,452 B1 | 5/2014 | Ding et al. |
| 8,719,835 B2 | 5/2014 | Kanso et al. |
| 8,752,042 B2 | 6/2014 | Ratica |
| 8,752,179 B2 | 6/2014 | Zaitsev |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,776,180 B2* | 7/2014 | Kumar et al. ... G06F 21/52 726/3 |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,461 B2 | 9/2014 | Saroiu et al. |
| 8,849,926 B2 | 9/2014 | Marzencki et al. |
| 8,863,252 B1 | 10/2014 | Katzer et al. |
| 8,881,258 B2 | 11/2014 | Paul et al. |
| 8,887,238 B2 | 11/2014 | Howard et al. |
| 8,904,520 B1 | 12/2014 | Nachenberg et al. |
| 8,914,856 B1 | 12/2014 | Velummylum et al. |
| 8,931,043 B2 | 1/2015 | Cooper et al. |
| 8,934,378 B1* | 1/2015 | Novick et al. ... H04L 45/04 370/255 |
| 8,954,610 B2 | 2/2015 | Berke et al. |
| 8,955,124 B2 | 2/2015 | Kim et al. |
| 8,966,625 B1 | 2/2015 | Zuk et al. |
| 8,973,147 B2 | 3/2015 | Pearcy et al. |
| 8,984,331 B2 | 3/2015 | Quinn |
| 8,990,386 B2 | 3/2015 | He et al. |
| 8,996,695 B2 | 3/2015 | Anderson et al. |
| 8,997,227 B1 | 3/2015 | Mhatre et al. |
| 9,015,716 B2 | 4/2015 | Fletcher et al. |
| 9,071,575 B2 | 6/2015 | Lemaster et al. |
| 9,088,598 B1* | 7/2015 | Zhang et al. ... H04L 63/1408 |
| 9,110,905 B2 | 8/2015 | Polley et al. |
| 9,117,075 B1 | 8/2015 | Yeh |
| 9,152,789 B2 | 10/2015 | Natarajan et al. |
| 9,160,764 B2 | 10/2015 | Stiansen et al. |
| 9,178,906 B1 | 11/2015 | Chen et al. |
| 9,185,127 B2 | 11/2015 | Neou et al. |
| 9,191,402 B2 | 11/2015 | Yan |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,773 B2 | 1/2016 | Degioanni |
| 9,258,217 B2 | 2/2016 | Duffield et al. |
| 9,281,940 B2 | 3/2016 | Matsuda et al. |
| 9,294,486 B1 | 3/2016 | Chiang et al. |
| 9,317,574 B1 | 4/2016 | Brisebois et al. |

(56) References Cited

U.S. PATENT DOCUMENTS

| | | | |
|---|---|---|---|
| 9,319,384 B2 | 4/2016 | Yan et al. | |
| 9,369,479 B2 | 6/2016 | Lin | |
| 9,372,914 B1* | 6/2016 | Asuncion et al. | G06F 16/285 |
| 9,396,327 B2 | 7/2016 | Auger et al. | |
| 9,405,903 B1 | 8/2016 | Xie et al. | |
| 9,413,587 B2 | 8/2016 | Smith et al. | |
| 9,418,222 B1 | 8/2016 | Rivera et al. | |
| 9,454,324 B1 | 9/2016 | Madhavapeddi | |
| 9,461,969 B2 | 10/2016 | Watt | |
| 9,501,744 B1 | 11/2016 | Brisebois et al. | |
| 9,602,573 B1* | 3/2017 | Abu-Ghazaleh et al. | G06F 15/16 |
| 9,634,915 B2 | 4/2017 | Bley | |
| 9,645,892 B1 | 5/2017 | Patwardhan | |
| 9,733,973 B2 | 8/2017 | Prasad et al. | |
| 9,781,004 B2 | 10/2017 | Danait et al. | |
| 9,911,083 B2* | 3/2018 | Chamness et al. | G06N 20/00 |
| 10,031,722 B1* | 7/2018 | Mutagi et al. | G06F 3/167 |
| 10,069,689 B1* | 9/2018 | Derby et al. | H04L 69/24 |
| 10,574,654 B1* | 2/2020 | Schroeder et al. | H04L 63/10 |
| 2002/0053033 A1 | 5/2002 | Cooper et al. | |
| 2002/0103793 A1* | 8/2002 | Koller et al. | G06F 16/2462 |
| 2002/0141343 A1 | 10/2002 | Bays | |
| 2002/0184393 A1 | 12/2002 | Leddy et al. | |
| 2003/0097439 A1 | 5/2003 | Strayer et al. | |
| 2003/0145232 A1 | 7/2003 | Poletto et al. | |
| 2003/0154399 A1 | 8/2003 | Zuk et al. | |
| 2004/0030776 A1 | 2/2004 | Cantrell et al. | |
| 2004/0167921 A1* | 8/2004 | Carson et al. | G06F 16/93 |
| 2004/0243533 A1 | 12/2004 | Dempster et al. | |
| 2004/0268149 A1 | 12/2004 | Aaron | |
| 2005/0039104 A1 | 2/2005 | Shah et al. | |
| 2005/0063377 A1 | 3/2005 | Bryant et al. | |
| 2005/0166066 A1 | 7/2005 | Ahuja et al. | |
| 2005/0185621 A1 | 8/2005 | Sivakumar et al. | |
| 2005/0207376 A1 | 9/2005 | Ashwood-Smith et al. | |
| 2005/0257244 A1* | 11/2005 | Joly et al. | G06F 21/604 726/1 |
| 2005/0289244 A1 | 12/2005 | Sahu et al. | |
| 2006/0048218 A1 | 3/2006 | Lingafelt et al. | |
| 2006/0080733 A1 | 4/2006 | Khosmood et al. | |
| 2006/0095968 A1 | 5/2006 | Portolani et al. | |
| 2006/0156408 A1 | 7/2006 | Himberger et al. | |
| 2006/0195448 A1 | 8/2006 | Newport | |
| 2006/0235972 A1* | 10/2006 | Asnis | H04L 29/12066 709/225 |
| 2006/0272018 A1 | 11/2006 | Fouant | |
| 2006/0274659 A1 | 12/2006 | Ouderkirk | |
| 2006/0294219 A1 | 12/2006 | Ogawa et al. | |
| 2007/0044147 A1 | 2/2007 | Choi et al. | |
| 2007/0097976 A1 | 5/2007 | Wood et al. | |
| 2007/0169179 A1 | 7/2007 | Narad | |
| 2007/0195729 A1 | 8/2007 | Li et al. | |
| 2007/0195797 A1 | 8/2007 | Patel et al. | |
| 2007/0211637 A1 | 9/2007 | Mitchell | |
| 2007/0300061 A1 | 12/2007 | Kim et al. | |
| 2008/0022385 A1 | 1/2008 | Crowell et al. | |
| 2008/0056124 A1 | 3/2008 | Nanda et al. | |
| 2008/0082662 A1 | 4/2008 | Dandliker et al. | |
| 2008/0101234 A1 | 5/2008 | Nakil et al. | |
| 2008/0126534 A1 | 5/2008 | Mueller et al. | |
| 2008/0250122 A1* | 10/2008 | Zsigmond et al. | H04L 67/34 709/220 |
| 2008/0270199 A1 | 10/2008 | Chess et al. | |
| 2008/0301765 A1 | 12/2008 | Nicol et al. | |
| 2009/0064332 A1 | 3/2009 | Porras et al. | |
| 2009/0133126 A1 | 5/2009 | Jang et al. | |
| 2009/0240789 A1* | 9/2009 | Dandabany | H04W 36/0011 709/220 |
| 2009/0241170 A1 | 9/2009 | Kumar et al. | |
| 2009/0307753 A1 | 12/2009 | Dupont et al. | |
| 2009/0313373 A1 | 12/2009 | Hanna et al. | |
| 2009/0313698 A1 | 12/2009 | Wahl | |
| 2009/0323543 A1 | 12/2009 | Shimakura | |
| 2009/0328219 A1 | 12/2009 | Narayanaswamy | |
| 2010/0005288 A1 | 1/2010 | Rao et al. | |
| 2010/0077445 A1 | 3/2010 | Schneider et al. | |
| 2010/0095293 A1 | 4/2010 | O'Neill et al. | |
| 2010/0095367 A1 | 4/2010 | Narayanaswamy | |
| 2010/0138810 A1 | 6/2010 | Komatsu et al. | |
| 2010/0148940 A1 | 6/2010 | Gelvin et al. | |
| 2010/0153316 A1 | 6/2010 | Duffield et al. | |
| 2010/0153696 A1 | 6/2010 | Beachem et al. | |
| 2010/0220584 A1 | 9/2010 | DeHaan et al. | |
| 2010/0235514 A1 | 9/2010 | Beachem | |
| 2010/0235915 A1 | 9/2010 | Memon et al. | |
| 2010/0303240 A1 | 12/2010 | Beachem et al. | |
| 2010/0319060 A1 | 12/2010 | Aiken et al. | |
| 2010/0332539 A1* | 12/2010 | Mohan et al. | G06F 16/285 707/776 |
| 2011/0010585 A1 | 1/2011 | Bugenhagen et al. | |
| 2011/0055381 A1 | 3/2011 | Narasimhan et al. | |
| 2011/0055388 A1 | 3/2011 | Yumerefendi et al. | |
| 2011/0066719 A1 | 3/2011 | Miryanov et al. | |
| 2011/0069685 A1 | 3/2011 | Tofighbakhsh | |
| 2011/0083125 A1 | 4/2011 | Komatsu et al. | |
| 2011/0126136 A1 | 5/2011 | Abella et al. | |
| 2011/0126275 A1 | 5/2011 | Anderson et al. | |
| 2011/0145885 A1 | 6/2011 | Rivers et al. | |
| 2011/0170860 A1 | 7/2011 | Smith et al. | |
| 2011/0173490 A1 | 7/2011 | Narayanaswamy et al. | |
| 2011/0185423 A1 | 7/2011 | Sallam | |
| 2011/0196957 A1 | 8/2011 | Ayachitula et al. | |
| 2011/0202655 A1 | 8/2011 | Sharma et al. | |
| 2011/0225207 A1 | 9/2011 | Subramanian et al. | |
| 2011/0228696 A1 | 9/2011 | Agarwal et al. | |
| 2011/0277034 A1 | 11/2011 | Hanson | |
| 2011/0302652 A1 | 12/2011 | Westerfeld | |
| 2011/0314148 A1 | 12/2011 | Petersen et al. | |
| 2012/0005542 A1 | 1/2012 | Petersen et al. | |
| 2012/0079592 A1 | 3/2012 | Pandrangi | |
| 2012/0102361 A1 | 4/2012 | Sass et al. | |
| 2012/0102543 A1 | 4/2012 | Kohli et al. | |
| 2012/0117226 A1 | 5/2012 | Tanaka et al. | |
| 2012/0136996 A1 | 5/2012 | Seo et al. | |
| 2012/0137278 A1 | 5/2012 | Draper et al. | |
| 2012/0137361 A1 | 5/2012 | Yi et al. | |
| 2012/0140626 A1 | 6/2012 | Anand et al. | |
| 2012/0197856 A1 | 8/2012 | Banka et al. | |
| 2012/0198541 A1 | 8/2012 | Reeves | |
| 2012/0216271 A1 | 8/2012 | Cooper et al. | |
| 2012/0233473 A1 | 9/2012 | Vasseur et al. | |
| 2012/0240232 A1 | 9/2012 | Azuma | |
| 2012/0246303 A1 | 9/2012 | Petersen et al. | |
| 2012/0266220 A1 | 10/2012 | Brudnicki et al. | |
| 2012/0278021 A1 | 11/2012 | Lin et al. | |
| 2013/0003538 A1 | 1/2013 | Greenberg et al. | |
| 2013/0006935 A1* | 1/2013 | Grisby | G06F 16/254 707/635 |
| 2013/0038358 A1 | 2/2013 | Cook et al. | |
| 2013/0086272 A1 | 4/2013 | Chen et al. | |
| 2013/0103827 A1 | 4/2013 | Dunlap et al. | |
| 2013/0145099 A1 | 6/2013 | Liu et al. | |
| 2013/0159999 A1 | 6/2013 | Chiueh et al. | |
| 2013/0174256 A1 | 7/2013 | Powers | |
| 2013/0179487 A1 | 7/2013 | Lubetzky et al. | |
| 2013/0179879 A1 | 7/2013 | Zhang et al. | |
| 2013/0198839 A1 | 8/2013 | Wei et al. | |
| 2013/0205215 A1* | 8/2013 | Dunn et al. | H04L 41/22 715/738 |
| 2013/0246925 A1 | 9/2013 | Ahuja et al. | |
| 2013/0247201 A1 | 9/2013 | Alperovitch et al. | |
| 2013/0254879 A1 | 9/2013 | Chesla et al. | |
| 2013/0268994 A1 | 10/2013 | Cooper et al. | |
| 2013/0275579 A1 | 10/2013 | Hernandez et al. | |
| 2013/0283374 A1 | 10/2013 | Zisapel et al. | |
| 2013/0290521 A1 | 10/2013 | Labovitz et al. | |
| 2013/0297771 A1 | 11/2013 | Osterloh et al. | |
| 2013/0304900 A1 | 11/2013 | Trabelsi et al. | |
| 2013/0305369 A1 | 11/2013 | Karta et al. | |
| 2013/0318357 A1 | 11/2013 | Abraham et al. | |
| 2013/0326623 A1 | 12/2013 | Kruglick | |
| 2013/0333029 A1 | 12/2013 | Chesla et al. | |
| 2013/0347103 A1 | 12/2013 | Veteikis et al. | |
| 2014/0006610 A1 | 1/2014 | Formby et al. | |
| 2014/0006871 A1 | 1/2014 | Lakshmanan et al. | |
| 2014/0012814 A1 | 1/2014 | Bercovici et al. | |
| 2014/0033193 A1 | 1/2014 | Palaniappan | |

(56) References Cited

U.S. PATENT DOCUMENTS

| | | | |
|---|---|---|---|
| 2014/0047185 A1 | 2/2014 | Peterson et al. | |
| 2014/0047372 A1 | 2/2014 | Gnezdov et al. | |
| 2014/0059200 A1 | 2/2014 | Nguyen et al. | |
| 2014/0089494 A1 | 3/2014 | Dasari et al. | |
| 2014/0096058 A1 | 4/2014 | Molesky et al. | |
| 2014/0115219 A1 | 4/2014 | Ajanovic et al. | |
| 2014/0143825 A1 | 5/2014 | Behrendt et al. | |
| 2014/0149490 A1 | 5/2014 | Luxenberg et al. | |
| 2014/0156814 A1 | 6/2014 | Barabash et al. | |
| 2014/0164607 A1 | 6/2014 | Bai et al. | |
| 2014/0165207 A1 | 6/2014 | Engel et al. | |
| 2014/0173623 A1 | 6/2014 | Chang et al. | |
| 2014/0192639 A1 | 7/2014 | Smirnov | |
| 2014/0201717 A1 | 7/2014 | Mascaro et al. | |
| 2014/0215573 A1 | 7/2014 | Cepuran | |
| 2014/0215621 A1 | 7/2014 | Xaypanya et al. | |
| 2014/0281030 A1 | 9/2014 | Cui et al. | |
| 2014/0289854 A1 | 9/2014 | Mahvi | |
| 2014/0298461 A1 | 10/2014 | Hohndel et al. | |
| 2014/0317737 A1 | 10/2014 | Shin et al. | |
| 2014/0331276 A1 | 11/2014 | Frascadore et al. | |
| 2014/0331280 A1 | 11/2014 | Porras et al. | |
| 2014/0331304 A1 | 11/2014 | Wong | |
| 2014/0351203 A1 | 11/2014 | Kunnatur et al. | |
| 2014/0351415 A1 | 11/2014 | Harrigan et al. | |
| 2014/0359695 A1 | 12/2014 | Chari et al. | |
| 2015/0009840 A1 | 1/2015 | Pruthi et al. | |
| 2015/0026809 A1 | 1/2015 | Altman et al. | |
| 2015/0033305 A1 | 1/2015 | Shear et al. | |
| 2015/0036533 A1 | 2/2015 | Sodhi et al. | |
| 2015/0039751 A1 | 2/2015 | Harrigan et al. | |
| 2015/0046882 A1 | 2/2015 | Menyhart et al. | |
| 2015/0058976 A1 | 2/2015 | Carney et al. | |
| 2015/0067143 A1 | 3/2015 | Babakhan et al. | |
| 2015/0082151 A1 | 3/2015 | Liang et al. | |
| 2015/0082430 A1 | 3/2015 | Sridhara et al. | |
| 2015/0085665 A1 | 3/2015 | Kompella et al. | |
| 2015/0095332 A1 | 4/2015 | Beisiegel et al. | |
| 2015/0112933 A1 | 4/2015 | Satapathy | |
| 2015/0113133 A1 | 4/2015 | Srinivas et al. | |
| 2015/0124608 A1 | 5/2015 | Agarwal et al. | |
| 2015/0128133 A1 | 5/2015 | Pohlmann | |
| 2015/0138993 A1 | 5/2015 | Forster et al. | |
| 2015/0142962 A1 | 5/2015 | Srinivas et al. | |
| 2015/0195291 A1 | 7/2015 | Zuk et al. | |
| 2015/0249622 A1 | 9/2015 | Phillips et al. | |
| 2015/0256555 A1 | 9/2015 | Choi et al. | |
| 2015/0261842 A1 | 9/2015 | Huang et al. | |
| 2015/0261886 A1* | 9/2015 | Wu et al. | G06F 16/9024 707/798 |
| 2015/0271255 A1 | 9/2015 | Mackay et al. | |
| 2015/0295945 A1 | 10/2015 | Canzanese, Jr. et al. | |
| 2015/0347554 A1 | 12/2015 | Vasantham et al. | |
| 2015/0356297 A1 | 12/2015 | Guri et al. | |
| 2015/0358352 A1 | 12/2015 | Chasin et al. | |
| 2016/0006753 A1 | 1/2016 | McDaid et al. | |
| 2016/0021131 A1 | 1/2016 | Heilig | |
| 2016/0026552 A1 | 1/2016 | Holden et al. | |
| 2016/0036837 A1 | 2/2016 | Jain et al. | |
| 2016/0050132 A1 | 2/2016 | Zhang | |
| 2016/0072815 A1 | 3/2016 | Rieke et al. | |
| 2016/0094529 A1 | 3/2016 | Mityagin | |
| 2016/0103692 A1 | 4/2016 | Guntaka et al. | |
| 2016/0105350 A1 | 4/2016 | Greifeneder et al. | |
| 2016/0112270 A1* | 4/2016 | Danait et al. | H04L 41/142 709/220 |
| 2016/0119234 A1 | 4/2016 | Valencia Lopez et al. | |
| 2016/0127395 A1 | 5/2016 | Underwood et al. | |
| 2016/0134533 A1* | 5/2016 | Janardhanan | H04L 45/04 370/392 |
| 2016/0147495 A1* | 5/2016 | Alpert | G06F 3/1446 345/1.3 |
| 2016/0147585 A1 | 5/2016 | Konig et al. | |
| 2016/0162308 A1 | 6/2016 | Chen et al. | |
| 2016/0162312 A1 | 6/2016 | Doherty et al. | |
| 2016/0173446 A1 | 6/2016 | Nantel | |
| 2016/0191476 A1 | 6/2016 | Schütz et al. | |
| 2016/0205002 A1 | 7/2016 | Rieke et al. | |
| 2016/0216994 A1 | 7/2016 | Sefidcon et al. | |
| 2016/0277488 A1* | 9/2016 | Fallon et al. | H04L 41/042 |
| 2016/0294691 A1 | 10/2016 | Joshi | |
| 2016/0308908 A1 | 10/2016 | Kirby et al. | |
| 2016/0321455 A1* | 11/2016 | Deng et al. | G06F 21/577 |
| 2016/0352526 A1* | 12/2016 | Adler et al. | G06Q 10/10 |
| 2016/0357424 A1 | 12/2016 | Pang et al. | |
| 2016/0357546 A1 | 12/2016 | Chang et al. | |
| 2016/0357587 A1 | 12/2016 | Yadav et al. | |
| 2016/0357957 A1 | 12/2016 | Deen et al. | |
| 2016/0359592 A1 | 12/2016 | Kulshreshtha et al. | |
| 2016/0359628 A1 | 12/2016 | Singh et al. | |
| 2016/0359658 A1 | 12/2016 | Yadav et al. | |
| 2016/0359673 A1 | 12/2016 | Gupta et al. | |
| 2016/0359677 A1 | 12/2016 | Kulshreshtha et al. | |
| 2016/0359678 A1 | 12/2016 | Madani et al. | |
| 2016/0359679 A1 | 12/2016 | Parandehgheibi et al. | |
| 2016/0359680 A1* | 12/2016 | Parandehgheibi et al. | H04J 3/14 |
| 2016/0359686 A1 | 12/2016 | Parandehgheibi et al. | |
| 2016/0359696 A1 | 12/2016 | Yadav et al. | |
| 2016/0359697 A1* | 12/2016 | Scheib et al. | G06F 16/162 |
| 2016/0359698 A1 | 12/2016 | Deen et al. | |
| 2016/0359699 A1 | 12/2016 | Gandham et al. | |
| 2016/0359700 A1 | 12/2016 | Pang et al. | |
| 2016/0359701 A1 | 12/2016 | Pang et al. | |
| 2016/0359703 A1 | 12/2016 | Gandham et al. | |
| 2016/0359704 A1 | 12/2016 | Gandham et al. | |
| 2016/0359705 A1 | 12/2016 | Parandehgheibi et al. | |
| 2016/0359708 A1 | 12/2016 | Gandham et al. | |
| 2016/0359709 A1 | 12/2016 | Deen et al. | |
| 2016/0359711 A1 | 12/2016 | Deen et al. | |
| 2016/0359712 A1 | 12/2016 | Alizadeh Attar et al. | |
| 2016/0359740 A1* | 12/2016 | Parandehgheibi et al. | G06F 16/2322 |
| 2016/0359759 A1 | 12/2016 | Singh et al. | |
| 2016/0359872 A1* | 12/2016 | Yadav et al. | H04L 43/04 |
| 2016/0359877 A1 | 12/2016 | Kulshreshtha et al. | |
| 2016/0359878 A1 | 12/2016 | Prasad et al. | |
| 2016/0359879 A1 | 12/2016 | Deen et al. | |
| 2016/0359880 A1 | 12/2016 | Pang et al. | |
| 2016/0359881 A1 | 12/2016 | Yadav et al. | |
| 2016/0359888 A1 | 12/2016 | Gupta et al. | |
| 2016/0359889 A1 | 12/2016 | Yadav et al. | |
| 2016/0359890 A1 | 12/2016 | Deen et al. | |
| 2016/0359891 A1 | 12/2016 | Pang et al. | |
| 2016/0359897 A1 | 12/2016 | Yadav et al. | |
| 2016/0359912 A1 | 12/2016 | Gupta et al. | |
| 2016/0359913 A1 | 12/2016 | Gupta et al. | |
| 2016/0359914 A1 | 12/2016 | Deen et al. | |
| 2016/0359915 A1 | 12/2016 | Gupta et al. | |
| 2016/0359917 A1 | 12/2016 | Rao et al. | |
| 2016/0373481 A1 | 12/2016 | Sultan et al. | |
| 2017/0034018 A1 | 2/2017 | Parandehgheibi et al. | |
| 2017/0079044 A1* | 3/2017 | Zhu et al. | H04W 72/04 |
| 2017/0094706 A1* | 3/2017 | Kim et al. | H04W 4/70 |
| 2017/0270315 A1* | 9/2017 | Kuo et al. | G06Q 50/265 |
| 2018/0006629 A1* | 1/2018 | Kravitz et al. | H04L 9/3255 |
| 2018/0006911 A1 | 1/2018 | Dickey | |
| 2018/0018602 A1* | 1/2018 | DiMaggio et al. | G06N 20/00 |
| 2018/0069688 A1* | 3/2018 | Arregui De La Cruz et al. | H04B 17/364 |

FOREIGN PATENT DOCUMENTS

| | | |
|---|---|---|
| CN | 102521537 A | 6/2012 |
| CN | 103023970 A | 4/2013 |
| CN | 103716137 A | 4/2014 |
| CN | 104065518 A | 9/2014 |
| EP | 0811942 A2 | 12/1997 |
| EP | 1383261 A1 | 1/2004 |
| EP | 1450511 A1 | 8/2004 |
| EP | 2045974 A1 | 4/2009 |
| EP | 2887595 A1 | 6/2015 |
| JP | 2009-016906 A | 1/2009 |
| KR | 1394338 B1 | 5/2014 |
| WO | 2007/014314 A2 | 2/2007 |
| WO | 2007/070711 A2 | 6/2007 |
| WO | 2008/069439 A1 | 6/2008 |
| WO | 2013/030830 A1 | 3/2013 |
| WO | 2015/042171 A1 | 3/2015 |

(56) References Cited

FOREIGN PATENT DOCUMENTS

| WO | 2015/099778 A1 | 7/2015 |
|---|---|---|
| WO | 2016/004075 A1 | 1/2016 |
| WO | 2016/019523 A1 | 2/2016 |

OTHER PUBLICATIONS

"Cisco IT Tetration Deployment, Part 1 of 2," Oct. 25, 2017, pp. 1-30.
Australian Government Department of Defence, Intelligence and Security, "Top 4 Strategies to Mitigate Targeted Cyber Intrusions," Cyber Security Operations Centre Jul. 2013, http://www.asd.gov.au/infosec/top-mitigations/top-4-strategies-explained.htm.
Author Unknown, "Blacklists & Dynamic Reputation: Understanding Why the Evolving Threat Eludes Blacklists," www.dambala.com, 9 pages, Dambala, Atlanta, GA, USA.
Aydein, Galip, et al., "Architecture and Implementation of a Scalable Sensor Data Storage and Analysis Using Cloud Computing and Big Data Technologies," Journal of Sensors, Vol. 2015, Article ID 834217, Feb. 2015, 11 pages.
Backes, Michael, et al., "Data Lineage in Malicious Environments," IEEE 2015, pages 1-13.
Bauch, Petr, "Reader's Report of Master's Thesis, Analysis and Testing of Distributed NoSQL Datastore Riak," May. 28, 2015, Brno. 2 pages.
Bayati, Mohsen, et al., "Message-Passing Algorithms for Sparse Network Alignment," Mar. 2013, 31 pages.
Berezinski, Przemyslaw, et al., "An Entropy-Based Network Anomaly Detection Method," Entropy, 2015, Vol. 17, www.mdpi.com/journal/entropy, pages 2367-2408.
Berthier, Robin, et al. "Nfsight: Netflow-based Network Awareness Tool," 2010, 16 pages.
Bhuyan, Dhiraj, "Fighting Bots and Botnets," 2006, pages 23-28.
Bosch, Greg, "Virtualization," 2010, 33 pages.
Breen, Christopher, "MAC 911, How to dismiss Mac App Store Notifications," Macworld.com, Mar. 24, 2014, 3 pages.
Chandran, Midhun, et al., "Monitoring in a Virtualized Environment," GSTF International Journal On Computing, Vol. 1, No. 1, Aug. 2010.
Chari, Suresh, et al., "Ensuring continuous compliance through reconciling policy with usage," Proceedings of the 18th ACM symposium on Access control models and technologies (SACMAT '13). ACM, New York, NY, USA, 49-60.
Chen Xu, et al., "Automating network application dependency discovery: experiences, limitations, and new solutions," 8th USENIX conference on Operating systems design and implementation (OSDI'08), USENIX Association, Berkeley, CA, USA, 117-130.
Chou, C.W., et al., "Optical Clocks and Relativity," Science Vol. 329, Sep. 24, 2010, pages 1630-1633.
Cisco Systems, "Cisco Network Analysis Modules (NAM) Tutorial," Cisco Systems, Inc., Version 3.5.
Cisco Systems, Inc., "A Cisco Guide to Defending Against Distributed Denial of Service Attacks," May. 3, 2016, 34 pages.
Cisco Systems, Inc., "Addressing Compliance from One Infrastructure: Cisco Unified Compliance Solution Framework," 2014.
Cisco Systems, Inc., "Cisco Application Dependency Mapping Service," 2009.
Cisco Systems, Inc., "Cisco Application Visibility and Control," Oct. 2011, 2 pages.
Cisco Systems, Inc., "Cisco Tetration Platform Data Sheet", Updated Mar. 5, 2018, 21 pages.
Cisco Systems, Inc., "White Paper - New Cisco Technologies Help Customers Achieve Regulatory Compliance," 1992-2008.
Cisco Technology, Inc., "Cisco Lock-and-Key:Dynamic Access Lists," http://www/cisco.com/c/en/us/support/docs/security-vpn/lock-key/7604-13.html; Updated Jul. 12, 2006, 16 pages.
Di Lorenzo, Guisy, et al., "EXSED: An Intelligent Tool for Exploration of Social Events Dynamics from Augmented Trajectories," Mobile Data Management (MDM), pages 323-330, Jun. 3-6, 2013.
Duan, Yiheng, et al., "Detective: Automatically Identify and Analyze Malware Processes in Forensic Scenarios via DLLs, IEEE ICC 2015 - Next Generation Networking Symposium, pages 5691-5696.
Feinstein, Laura, et al., "Statistical Approaches to DDoS Attack Detection and Response," Proceedings of the DARPA Information Survivability Conference and Exposition (DISCEX '03), Apr. 2003, 12 pages.
George, Ashley, et al., "NetPal: A Dynamic Network Administration Knowledge Base," 2008, pages 1-14.
Goldsteen, Abigail, et al., "A Tool for Monitoring and Maintaining System Trustworthiness at Run Time," REFSQ (2015), pages 142-147.
Hamadi, S., et al., "Fast Path Acceleration for Open vSwitch in Overlay Networks," Global Information Infrastructure and Networking Symposium (GIIS), Montreal, QC, pages 1-5, Sep. 15-19, 2014.
Heckman, Sarah, et al., "On Establishing a Benchmark for Evaluating Static Analysis Alert Prioritization and Classification Techniques," IEEE, 2008; 10 pages.
Hewlett-Packard, "Effective use of reputation intelligence in a security operations center," Jul. 2013, 6 pages.
Hideshima, Yusuke, et al., "Starmine: A Visualization System for Cyber Attacks," https://www.researchgate.net/publication/221536306, Feb. 2006, 9 pages.
Huang, Hing-jie, et al., "Clock Skew Based Node Identification in Wireless Sensor Networks," IEEE, 2008, 5 pages.
InternetPerils, Inc., "Control Your Internet Business Risk," 2003-2015, https://www.internetperils.com .
Ives, Herbert, E., et al., "An Experimental Study of the Rate of a Moving Atomic Clock," Journal of the Optical Society of America, Vol. 28, No. 7, Jul. 1938, pages 215-226.
Janoff, Christian, et al., "Cisco Compliance Solution for HIPAA Security Rule Design and Implementation Guide," Cisco Systems, Inc., Updated Nov. 14, 2015, part 1 of 2, 350 pages.
Janoff, Christian, et al., "Cisco Compliance Solution for HIPAA Security Rule Design and Implementation Guide," Cisco Systems, Inc., Updated Nov. 14, 2015, part 2 of 2, 588 pages.
Kerrison, Adam, et al., "Four Steps to Faster, Better Application Dependency Mapping - Laying the Foundation for Effective Business Service Models," BMCSoftware, 2011.
Kim, Myung-Sup, et al. "A Flow-based Method for Abnormal Network Traffic Detection," IEEE, 2004, pages 599-612.
Lab Sku, "VMware Hands-on Labs - HOL-SDC-1301" Version: 20140321-160709, 2013; http://docs.hol.vmware.com/HOL-2013/holsdc-1301htmlen/ (part 1 of 2).
Lab Sku, "VMware Hands-on Labs - HOL-SDC-1301" Version: 20140321-160709, 2013; http://docs.hol.vmware.com/HOL-2013/holsdc-1301htmlen/ (part 2 of 2).
Lachance, Michael, "Dirty Little Secrets of Application Dependency Mapping," Dec. 26, 2007.
Landman, Yoav, et al., "Dependency Analyzer," Feb. 14, 2008, http://jfrog.com/confluence/display/DA/Home.
Lee, Sihyung, "Reducing Complexity of Large-Scale Network Configuration Management," Ph.D. Dissertation, Carniege Mellon University, 2010.
Li, Ang, et al., "Fast Anomaly Detection for Large Data Centers," Global Telecommunications Conference (GLOBECOM 2010, Dec. 2010, 6 pages.
Liu, Ting, et al., "Impala: A Middleware System For Managing Autonomic, Parallel Sensor Systems," In Proceedings of the Ninth ACM SIGPLAN Symposium On Principles And Practice Of Parallel Programming(PPoPP '03), ACM, New York, NY, USA, Jun. 11-13, 2003, pages 107-118.
Lu, Zhonghai, et al., "Cluster-based Simulated Annealing for Mapping Cores onto 2D Mesh Networks on Chip," Design and Diagnostics of Electronic Circuits and Systems, pp.1, 6, 16-18, Apr. 2008.
Matteson, Ryan, "Depmap: Dependency Mapping of Applications Using Operating System Events: a Thesis," Master's Thesis, California Polytechnic State University, Dec. 2010.
Natarajan, Arun, et al., "NSDMiner: Automated Discovery of Network Service Dependencies," Institute of Electrical and Electronics Engineers INFOCOM, Feb. 2012, 9 pages.

(56) References Cited

OTHER PUBLICATIONS

Navaz, A.S. Syed, et al., "Entropy based Anomaly Detection System to Prevent DDoS Attacks in Cloud," International Journal of computer Applications (0975-8887), Vol. 62, No. 15, Jan. 2013, pages 42-47.
Neverfail, "Neverfail IT Continuity Architect," 2015, https://web.archive.org/web/20150908090456/http://www.neverfailgroup.com/products/it-continuity-architect .
Nilsson, Dennis K., et al., "Key Management And Secure Software Updates In Wireless Process Control Environments," In Proceedings of the First ACM Conference On Wireless Network Security (WiSec '08), ACM, New York, NY, USA, Mar. 31-Apr. 2, 2008, pages 100-108.
Nunnally, Troy, et al., "P3D: A Parallel 3D Coordinate Visualization for Advanced Network Scans," IEEE 2013, Jun. 9-13, 2013, 6 pages.
O'Donnell, Glenn, et al., "The CMDB Imperative: How to Realize the Dream and Avoid the Nightmares," Prentice Hall, Feb. 19, 2009.
Ohta, Kohei, et al., "Detection, Defense, and Tracking of Internet-Wide Illegal Access in a Distributed Manner," 2000, pages 1-16.
Pathway Systems International Inc., "How Blueprints does Integration," Apr. 15, 2014, 9 pages, http://pathwaysystems.com/company-blog/ .
Pathway Systems International Inc., "What is Blueprints?" 2010-2016, http://pathwaysystems.com/blueprints-about/.
Popa, Lucian, et al., "Macroscope: End-Point Approach to Networked Application Dependency Discovery," CoNEXT'09, Dec. 1-4, 2009, Rome, Italy, 12 pages.
Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.
Sachan, Mrinmaya, et al., "Solving Electrical Networks to incorporate Supervision in Random Walks," May. 13-17, 2013, pages 109-110.
Sammarco, Matteo, et al., "Trace Selection for Improved WLAN Monitoring," Aug. 16, 2013, pages 9-14.
Shneiderman, Ben, et al., "Network Visualization by Semantic Substrates," Visualization and Computer Graphics, Vol.12, No.5, pp.733,740, Sep.-Oct. 2006.
Thomas, R., "Bogon Dotted Decimal List," Version 7.0, Team Cymru NOC, Apr. 27, 2012, 5 pages.
Wang, Ru, et al., "Learning directed acyclic graphs via bootstarp aggregating," 2014, 47 pages, http://arxiv.org/abs/1406.2098 .
Wang, Yongjun, et al., "A Network Gene-Based Framework for Detecting Advanced Persistent Threats," Nov. 2014, 7 pages.
Witze, Alexandra, "Special relativity aces time trial, 'Time dilation' predicted by Einstein confirmed by lithium ion experiment," Nature, Sep. 19, 2014, 3 pages.
Woodberg, Brad, "Snippet from Juniper SRX Series" Jun. 17, 2013, 1 page, O'Reilly Media, Inc.
Zatrochova, "Analysis and Testing of Distributed NoSQL Datastore Riak," Spring, 2015, 76 pages.
Zhang, Yue, et al., "Cantina: A Content-Based Approach to Detecting Phishing Web Sites," May. 8-12, 2007, pages 639-648.
Arista Networks, Inc., "Application Visibility and Network Telemtry using Splunk," Arista White Paper, Nov. 2013, 11 pages.
Blair, Dana, et al., U.S. Appl. No. 62/106,006, tiled Jan. 21, 2015, entitled "Monitoring Network Policy Compliance."
Kraemer, Brian, "Get to know your data center with CMDB," TechTarget, Apr. 5, 2006, http://searchdatacenter.techtarget.com/news/118820/Get-to-know-your-data-center-with-CMDB .
Li, Bingbong, et al., "A Supervised Machine Learning Approach to Classify Host Roles On Line Using sFlow," in Proceedings of the first edition workshop on High performance and programmable networking, 2013, ACM, New York, NY, USA, 53-60.

\* cited by examiner

ENDPOINT CLUSTER ASSIGNMENT AND QUERY GENERATION

CROSS-REFERENCE TO RELATED APPLICATIONS

This application claims benefit to U.S. Provisional Application No. 62/616,347, filed on Jan. 11, 2018, of which is hereby expressly incorporated by reference in its entirety.

TECHNICAL FIELD

The subject disclosure relates to the identification of network device characteristics and in particular, an automatic process for resolving network device cluster associations based on comparisons between network device and cluster characteristics.

INTRODUCTION

An enterprise application is a set of workloads (e.g., computing, networking, and storage services) that are generally distributed across various nodes (or endpoints) of a network and the relationships (e.g., connectivity, dependencies, network and security policies, etc.) between the workloads. An application can include a presentation tier, an application tier, and a data tier. The presentation tier may depend on the application tier and authentication services, and the application tier may depend on the web tier and external network services (e.g., a travel reservation system, an ordering tool, a billing tool, etc.). These tiers may further depend on firewall, load balancing, wide area network (WAN) acceleration, and other network services. An enterprise can include hundreds or thousands of applications of similar and different architectures.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
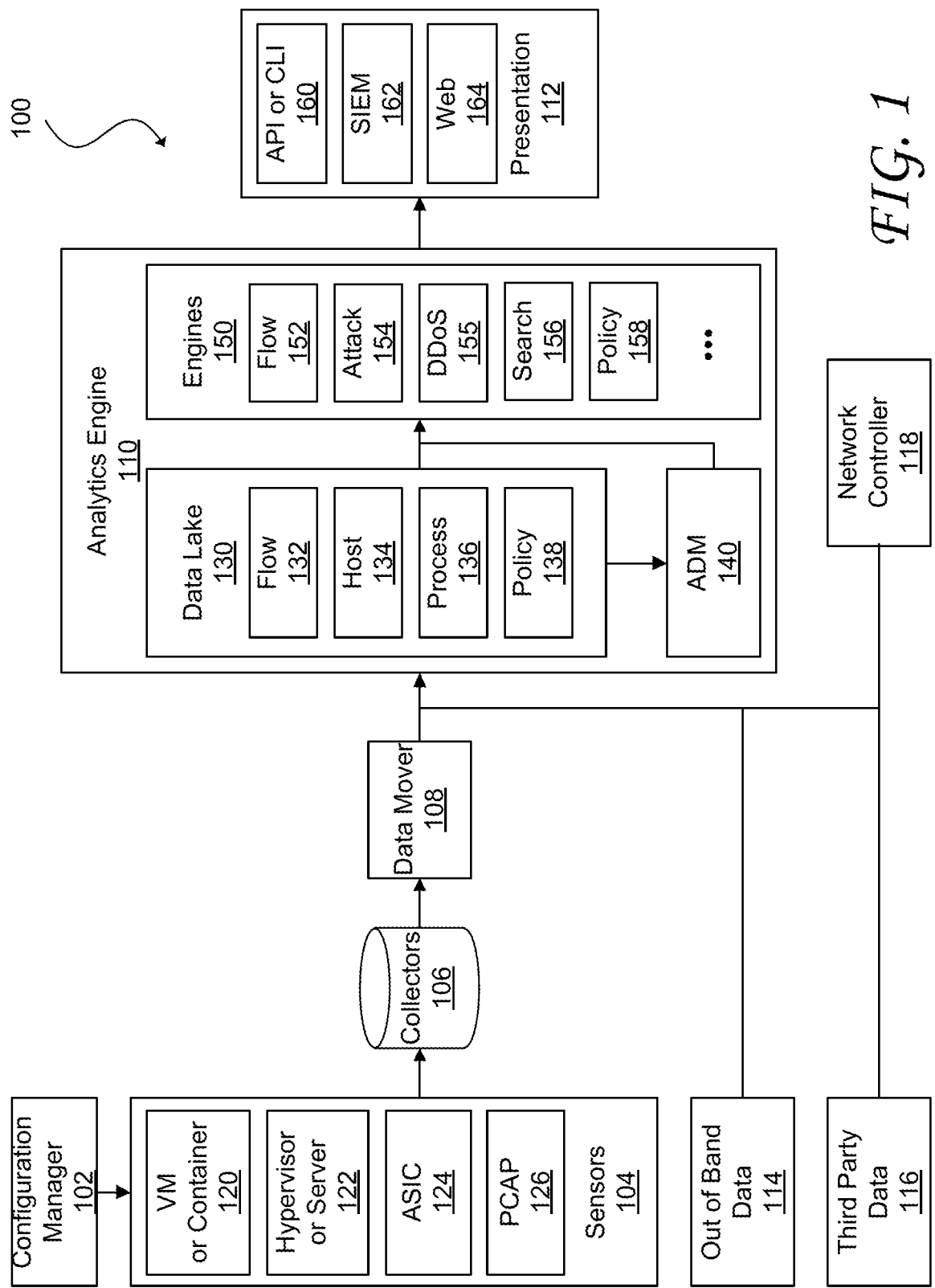
FIG. 1 illustrates an example of a network monitoring system that can be used to implement various aspects of an application clustering and query generation technology.

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology; however, it will be clear and apparent that the subject technology is not limited to the specific details set forth herein and may be practiced without these details. In some instances, structures and components are shown in block diagram form in order to avoid obscuring certain concepts.

A thorough understanding of applications running in a data center can be critical for network management tasks such as anomaly detection (e.g., network attacks and misconfiguration), asset management (e.g., monitoring, capacity planning, consolidation, migration, and continuity planning), and compliance (e.g. conformance with governmental regulations, industry standards, and corporate policies). Despite the workload relationship complexities discussed above, traditional approaches for developing insights into an enterprise's workloads require comprehensive knowledge on the part of human operators and the use of processes that are manual and largely customized for a particular enterprise. To the extent automated solutions exist conventional techniques for application dependency mapping (ADM) suffer from various drawbacks.

Conventional automated ADM techniques often assume stationary locations for workloads, which is an invalid assumption for many networks. For example, many enterprises implement virtualization platforms that support migration of VMs and containers, such as for optimizing distribution of workloads or for failover handling. Additionally, conventional ADM processes rely on static and structured feature vectors or signatures (i.e., bases of comparison) for discovering applications and application dependency maps. In addition, conventional ADM systems are often incapable of or fail to gather all relevant information for identifying workloads and their interdependencies.

Networks can be configured to automate discovery of applications and map the applications' interdependencies. Using sensors deployed on (or attached to) various networking devices (e.g., routers, switches, network appliances), physical servers, hypervisors or shared kernels, and virtual partitions (e.g., VMs or containers), and/or other network elements, etc., information regarding device characteristics can be collected. Using networks of such sensors, information of traffic passing through the network can be aggregated and analyzed, providing multiple perspectives for the traffic.

In some aspects, network device information can be used to automatically form endpoint clusters. For example, endpoint characteristics can be mapped into feature vectors representing multiple various characteristic dimensions for a given node. Feature vectors representing nodes or endpoints (e.g., physical servers, VMs, or containers), can be used to assess similarities between endpoints, and to facilitate the automatic grouping of endpoints into clusters. Therefore, cluster characteristics can represent common endpoint characteristics shared by member endpoints (network devices), and can be used to identify functional device groupings, or characteristics that make up a tier or component of an application, etc. Additional details regarding endpoint cluster formation are provided by U.S. Application No. 15/145,493, entitled, "CLUSTER DISCOVERY VIA A MULTI-DOMAIN FUSION FOR APPLICATION DEPENDENCY MAPPING," which is herein incorporated by reference in its entirety.

Although clustering techniques can be used to automate cluster creation, the dynamic nature of large enterprise networks makes it difficult to maintain static cluster characteristics. For example, initial cluster formation can be based on shared characteristics of endpoint members; however, as network and endpoint characteristics change, individual members begin to take on different properties. As a result, static clusters often result in a collection of member device that share very little in common. These difference can make it difficult to perform new cluster assignments, and can frustrate the administration of cluster based policies, e.g., by system administrators.

Overview

Aspects of the disclosed technology address the foregoing limitations of conventional clustering techniques, by providing systems and methods for automatically managing cluster membership for various endpoint devices. In some implementations, the disclosed technology provides a process of endpoint cluster management that include steps for: automatically identifying one or more device characteristics associated with a first network device, automatically identifying one or more cluster characteristics for each of a first cluster and a second cluster, and automatically comparing the device characteristics associated with the first network device with the one or more cluster characteristics for the first cluster and the second cluster. In some approaches, the process can further include steps for: automatically adding the first network device to the first cluster based on the cluster characteristics for the first cluster and the device characteristics for the first network device, automatically detecting a change to one or more device characteristics associated with a second network device, wherein the second network device is a member of the second cluster, and automatically removing the second network device from the second cluster based on changes to the one or more device characteristics associated with the second network device.

In some aspects, the processors can be further configured to perform operations for automatically detecting a change to one or more device characteristics associated with a second network device, wherein the second network device is a member of the second cluster, and automatically removing the second network device from the second cluster based on changes to the one or more device characteristics associated with the second network device.

In some aspects, the processors can be further configured to perform operations for automatically generating a first query associated with the first cluster, the first query comprising one or more labels that describe at least one of the cluster characteristics for the first cluster. In some implementations, the first query is user selectable Boolean expression that uniquely identifies the first cluster. In some aspects, the device characteristics associated with the first network device include one or more of: names, labels, metadata tags, or key value pairs. In some aspects, automatically adding the first network device to the first cluster based on the cluster characteristics is performed using a machine-learning model. In some aspects, identifying the one or more cluster characteristics for the first cluster and the second cluster is automatically performed at periodic intervals.

Description

Endpoint cluster management techniques of the disclosed technology provide ways to sort newly instantiated endpoint devices into pre-existing clusters, and/or to manage endpoint membership in existing clusters. That is, in some aspects, the disclosed technology provides methods for identifying when endpoint or cluster characteristics have changed, and then moving endpoints in to/out of various clusters to ensure that cluster characteristics for any given cluster are sufficiently homogenous. Additionally, the disclosed technology provides automated solutions for generating user selectable queries that are composed of terms describing characteristics of a given cluster or endpoint. That is, as used herein, query can refer to a Boolean expression identifies a specific cluster. Queries can be designed to facilitate the search, identification, and selection of a given cluster, e.g., by system administrator or other user.

Referring now to the drawings, FIG. 1 is an illustration of an example network traffic monitoring system 100 in accordance with some aspects of the technology. Monitoring system 100 can include a configuration manager 102, sensors 104, a collector module 106, a data mover module 108, an analytics engine 110, and a presentation module 112. In FIG. 1, the analytics engine 110 is also shown in communication with out-of-band data sources 114, third-party data sources 116, and a network controller 118.

Configuration manager 102 can be used to provision and maintain sensors 104, including installing sensor software or firmware in various network nodes, configuring sensors 104, updating the sensor software or firmware, among other sensor management tasks. For example, sensors 104 can be implemented as virtual partition images, e.g., virtual machine (VM) images or container images, and configuration manager 102 can distribute the images to host machines. The software environment may include an operating system and application software. For software running within a virtual partition, the virtual partition may appear to be, for example, one of many servers or one of many operating systems executed on a single physical server. Configuration manager 102 can instantiate a new virtual partition or migrate an existing partition to a different physical server. Configuration manager 102 can also be used to configure the new or migrated sensor.

Configuration manager 102 can also monitor the health of sensors 104. For example, configuration manager 102 can request status updates and/or receive heartbeat messages, initiate performance tests, generate health checks, and/or perform other monitoring tasks. In some embodiments, configuration manager 102 can also authenticate sensors 104. For instance, sensors 104 can be assigned a unique identifier, such as by using a one-way hash function of a sensor's basic input/out system (BIOS) universally unique identifier (UUID) and a secret key stored by configuration image manager 102.

Sensors 104 can reside on various nodes of a network, such as a virtual partition (e.g., VM or container) 120; a hypervisor or shared kernel managing one or more virtual partitions and/or physical servers 122, an application-specific integrated circuit (ASIC) 124 of a switch, router, gateway, or other networking device, or a packet capture (pcap) 126 appliance (e.g., a standalone packet monitor, a device connected to a network devices monitoring port, a device connected in series along a main trunk of a datacenter, or similar device), or other element of a network. Sensors 104 can monitor network traffic between nodes, and send network traffic data and corresponding data (e.g., host data, process data, user data, etc.) to collectors 108 for storage. For example, sensors 104 can sniff packets being sent over its hosts' physical or virtual network interface card (NIC), or individual processes can be configured to report network traffic and corresponding data to sensors 104.

Incorporating sensors 104 on multiple nodes and within multiple partitions of some nodes of the network can provide for robust capture of network traffic and corresponding data from each hop of data transmission. In some embodiments, each node of the network (e.g., VM, container, or other virtual partition 120, hypervisor, shared kernel, or physical server 122, ASIC 124, pcap 126, etc.) includes a respective sensor 104. However, it should be understood that various software and hardware configurations can be used to implement sensor network 104.

As sensors 104 capture communications and corresponding data, they may continuously send network traffic data to collectors 108. Network traffic data can include metadata relating to a packet, a collection of packets, a flow, a bi-directional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics.

Sensors 104 can also determine additional data for each session, bidirectional flow, flow, packet, or other more granular or less granular network communication. The additional data can include host and/or endpoint information, virtual partition information, sensor information, process information, user information, tenant information, application information, network topology, application dependency mapping, cluster information, or other information corresponding to each flow.

In some aspects, sensors 104 can also perform preprocessing of the network traffic and corresponding data before sending the data to collectors 108. For example, sensors 104 can remove extraneous or duplicative data and/or create summaries of the data, e.g., latency, number of packets per flow, number of bytes per flow, number of flows, etc. In some embodiments, sensors 104 can be configured to only capture certain types of network information and disregard the rest. By way of example, sensors 104 can be configured to capture only a representative sample of packets (e.g., every 1,000 th packet or other suitable sample rate) and corresponding data.

Since sensors 104 can be located throughout the network, traffic and corresponding data can be collected from multiple vantage points or network perspectives to provide a more comprehensive view of network behavior. High fidelity data capture permits the data to be correlated from the various data sources, which may be used as additional data points by analytics engine 110. Further, collecting network traffic and corresponding data from multiple points of view ensures more accurate data is captured. For example, a conventional sensor network may be limited to sensors running on external-facing network devices (e.g., routers, switches, network appliances, etc.) such that east-west traffic, including VM-to-VM or container-to-container traffic on a same host may not be monitored.

Network traffic monitoring system 100 can be configured to assemble the most accurate data flow sets and corresponding sensor data. Sensors 104 can send network traffic and corresponding data to the collectors 106. Collectors 106 can be any type of storage medium that can serve as a repository for the network traffic and corresponding data captured by sensors 104. In some embodiments, data storage for collectors 106 can be located in an in-memory database, such as dashDB from IBM®, although it should be appreciated that the data storage for collectors 106 can be any software and/or hardware capable of providing rapid random access speeds typically used for analytics software. For example, the collectors 106 can utilize solid state drives, disk drives, magnetic tape drives, or a combination of the foregoing according to cost, responsiveness, and size requirements. Further, collectors 106 can utilize various database structures such as a normalized relational database or a NoSQL database, among others.

In some deployments, collectors 106 may only serve as network storage for the network traffic monitoring system 100. In such embodiments, network traffic monitoring system 100 can include a data mover module 108 for retrieving data from collectors 106 and making the data available to network clients, such as the components of analytics engine 110. In effect, data mover module 108 can serve as a gateway for presenting network-attached storage to the network clients.

Analytics engine 110 may be provided with examples of network states corresponding to an attack and network states corresponding to normal operation. The analytics engine 110 can then analyze network traffic and corresponding data to recognize when the network is under attack. In some embodiments, the network may operate within a trusted environment for a period of time so that the analytics engine 110 can establish a baseline of normal operation. Since malware is constantly evolving and changing, machine learning may be used to dynamically update models for identifying malicious traffic patterns.

In some embodiments, analytics engine 110 may be used to identify observations which differ from other examples in a dataset. For example, if a training set of example data with known outlier labels exists, supervised anomaly detection techniques may be used. Additionally, analytics engine 110 can include a data lake 130, an application dependency mapping (ADM) module 140, and elastic processing engines 150.

Data lake 130 is a large-scale storage repository that provides massive storage for various types of data, enormous processing power, and the ability to handle a nearly limitless number of concurrent tasks or jobs. In some embodiments, data lake 130 is implemented using the Hadoop® Distributed File System (HDFS™) from Apache® Software Foundation. HDFS™ is a highly scalable and distributed file system that can scale to thousands of cluster nodes, millions of files, and petabytes of data. HDFS™ is optimized for batch processing where data locations are exposed to allow computations to take place where the data resides. HDFS™ provides a single namespace for an entire cluster to allow for data coherency in a write-once, read-many access model. That is, clients can only append to existing files in the node. In HDFS™, files are separated into blocks, which are typically 64 MB in size and are replicated in multiple data nodes.

Clients access data directly from data nodes. In some embodiments, data mover 108 receives raw network traffic and corresponding data from the collectors 106 and distributes or pushes the data to the data lake 130. Data lake 130 can also receive and store out-of-band data 114, such as statuses on power levels, network availability, server performance, temperature conditions, cage door positions, and other data from internal sources, and third party data 116, such as security reports (e.g., provided by Cisco® Systems, Inc. of San Jose, California, Arbor Networks® of Burlington, Massachusetts, Symantec® Corp. of Sunnyvale, California, Sophos® Group plc of Abingdon, England, Microsoft® Corp. of Seattle, Washington, Verizon® Communications, Inc. of New York, New York, among others), geolocation data, IP watch lists, Whois data, configuration management database (CMDB) or configuration management system (CMS) as a service, and other data from external sources.

Each component of the data lake 130 can perform certain processing of the raw network traffic data and/or other data (e.g., host data, process data, user data, out-of-band data or third party data) to transform the raw data to a form useable by elastic processing engines 150. In some embodiments, the data lake 130 can include repositories for flow attributes 132, host and/or endpoint attributes 134, process attributes 136, and policy attributes 138. In some embodiments, the data lake 130 can also include repositories for VM or container attributes, application attributes, tenant attributes, network topology, application dependency maps, cluster attributes, etc.

Flow attributes 132 relate to information about flows traversing the network. A flow is generally one or more packets sharing certain attributes that are sent within a network within a specified period of time. Flow attributes 132 can include packet header fields, including but not limited to: a source address (e.g., Internet Protocol (IP) address, Media Access Control (MAC) address, Domain Name System (DNS) name, or other network address), source port, destination address, destination port, protocol type, class of service, among other fields. The source address may correspond to a first endpoint (e.g., network device, physical server, virtual partition, etc.) of the network, and the destination address may correspond to a second endpoint, a multicast group, or a broadcast domain. Flow attributes 132 can also include aggregate packet data such as flow start time, flow end time, number of packets for a flow, number of bytes for a flow, the union of TCP flags for a flow, among other flow data.

Host and/or endpoint attributes 134 describe host and/or endpoint data for each flow, and can include host and/or endpoint name, network address, operating system, CPU usage, network usage, disk space, ports, logged users, scheduled jobs, open files, and information regarding files and/or directories stored on a host and/or endpoint (e.g., presence, absence, or modifications of log files, configuration files, device special files, or protected electronic information). Host and/or endpoints attributes 134 can also include the out-of-band data 114 regarding hosts such as power level, temperature, and physical location (e.g., room, row, rack, cage door position, etc.) or third party data 116 such as whether a host and/or endpoint is on an IP watch list or otherwise associated with a security threat, Whois data, or geo-coordinates.

In some embodiments, host and/or endpoint attributes or characteristics create tags or labels to describe network device or cluster characteristics. By way of the above examples, tags can be used to identify hosts, e.g., by Domain Name System (DNS) name, IP address, Media Access Control (MAC) address or other network address, source port, protocol type, class of service, virtual partition information, process information, operating system (OS) type, tenant information, application information, network topology characteristics, cluster membership, and/or application dependencies, etc. As discussed in further detail below, tags can be represented by key-value pairs, such as, by using Boolean expressions representing concatenations of multiple tags.

Process attributes 136 relate to process data corresponding to each flow, and can include process name (e.g., bash, httpd, netstat, etc.), ID, parent process ID, path (e.g., /usr2/username/bin/, /usr/local/bin, /usr/bin, etc.), CPU utilization, memory utilization, memory address, scheduling information, nice value, flags, priority, status, start time, terminal type, CPU time taken by the process, the command that started the process, and information regarding a process owner (e.g., user name, ID, user's real name, e-mail address, user's groups, terminal information, login time, expiration date of login, idle time, and information regarding files and/or directories of the user).

Policy attributes 138 contain information relating to network policies. Policies establish whether a particular flow is allowed or denied by the network as well as a specific route by which a packet traverses the network. Policies can also be used to mark packets so that certain kinds of traffic receive differentiated service when used in combination with queuing techniques such as those based on priority, fairness, weighted fairness, token bucket, random early detection, round robin, among others.

Analytics engine 110 may include any number of engines 150, including for example, a flow engine 152 for identifying flows (e.g., flow engine 152) or an attacks engine 154 for identify attacks to the network. In some embodiments, the analytics engine can include a separate distributed denial of service (DDoS) attack engine 155 for specifically detecting DDoS attacks. The analytics engine 110 may further include a search engine 156. The search engine 156 may be configured, for example to perform a structured search, an NLP (Natural Language Processing) search, or a visual search. Data may be provided to the engines from one or more processing components. Analytics engine 110 can also include a policy engine 158 that manages network policy, including creating and/or importing policies, monitoring policy conformance and non-conformance, enforcing policy, simulating changes to policy or network elements affecting policy, among other policy-related tasks.

The presentation module 112 can include an application programming interface (API) or command line interface (CLI) 160, a security information and event management (SIEM) interface 162, and a web front-end 164. As the analytics engine 110 processes network traffic and corresponding data and generates analytics data, the analytics data may not be in a human-readable form or it may be too voluminous for a user to navigate. The presentation module 112 can take the analytics data generated by analytics engine 110 and further summarize, filter, and organize the analytics data as well as create intuitive presentations for the analytics data.

ADM module 140 can determine dependencies of applications of the network. That is, particular patterns of traffic may correspond to an application, and the interconnectivity or dependencies of the application can be mapped to generate a graph for the application (i.e., an application dependency mapping). In this context, an application refers to a set of networking components that provides connectivity for a given set of workloads. For example, in a conventional three-tier architecture for a web application, first endpoints of the web tier, second endpoints of the application tier, and third endpoints of the data tier make up the web application. ADM module 140 can receive input data from various repositories of the data lake 130, e.g., the flow attributes 132, the host and/or endpoint attributes 134, the process attributes 136, etc.

As discussed in further detail with respect to FIGS. 3 and 4 below, ADM module 140 can facilitate cluster management techniques of the disclosed technology, which can include cluster grouping (e.g. endpoint classification) that is performed by categorizing (grouping) network endpoints based on endpoint (network device) characteristics and cluster characteristics.

Cluster grouping and management can be administered using a machine learning (ML) model, such as a classifier comprising a multilayer perceptron neural network. Machine learning solutions for matching network device characteristics with cluster characteristics help automate the process of adding (and removing) endpoint members from a cluster, and ensuring that devices sharing a common cluster also have sufficiently similar characteristic vectors. In some approaches, machine learning implementations can be used to facilitate various portions of endpoint cluster creation, update/management, and query generation. For example, machine learning (ML) techniques may be applied to the collected data to evaluate and determine optimal features across multiple domains for discovering application tendencies, and for creating clusters. Such techniques can also be used to evaluate ongoing changes to device characteristics as the network evolves, and to re-form clusters based on the updated characteristics.

Although it is understood that the described techniques can be implemented using a variety of machine learning and/or classification algorithms, the scope of the technology is not limited to a specific machine learning implementation. Implementations of the technology can include the deployment of multi-layered ML models based on one or more classification algorithms, including but not limited to: a Multinomial Naive Bayes classifier, a Bernoulli Naive Bayes classifier, a Perceptron classifier, a Stochastic Gradient Descent (SGD) Classifier, and/or a Passive Aggressive Classifier, or the like.

In some aspects, ML models can be configured to perform various types of regression, for example, using one or more regression algorithms, including but not limited to: Deep Learning, a Stochastic Gradient Descent Regressor, and/or a Passive Aggressive Regressor, etc. ML models can also be based on clustering algorithms (e.g., a Mini-batch K-means clustering algorithm), a recommendation algorithm (e.g., a Miniwise Hashing algorithm, or Euclidean LSH algorithm), and/or an anomaly detection algorithm, such as a Local outlier factor. Additionally, ML models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Additionally, in some aspects, device characteristics may be represented by one or more key value pairs (KVPs), i.e., a set of two linked data items: a unique key that identifies an item of data (e.g., a device characteristic), and the value, which is either the data that is identified or a pointer to the location of that data.

Although FIG. 1 illustrates an example configuration of the various components of a network traffic monitoring system, those of skill in the art will understand that the components of the network traffic monitoring system 100 or any system described herein can be configured in a number of different ways and can include any other type and number of components. For example, the sensors 104, the collectors 106, the data mover 108, and the data lake 130 can belong to one hardware and/or software module or multiple separate modules. Other modules can also be combined into fewer components and/or further divided into more components.

Figure 2:
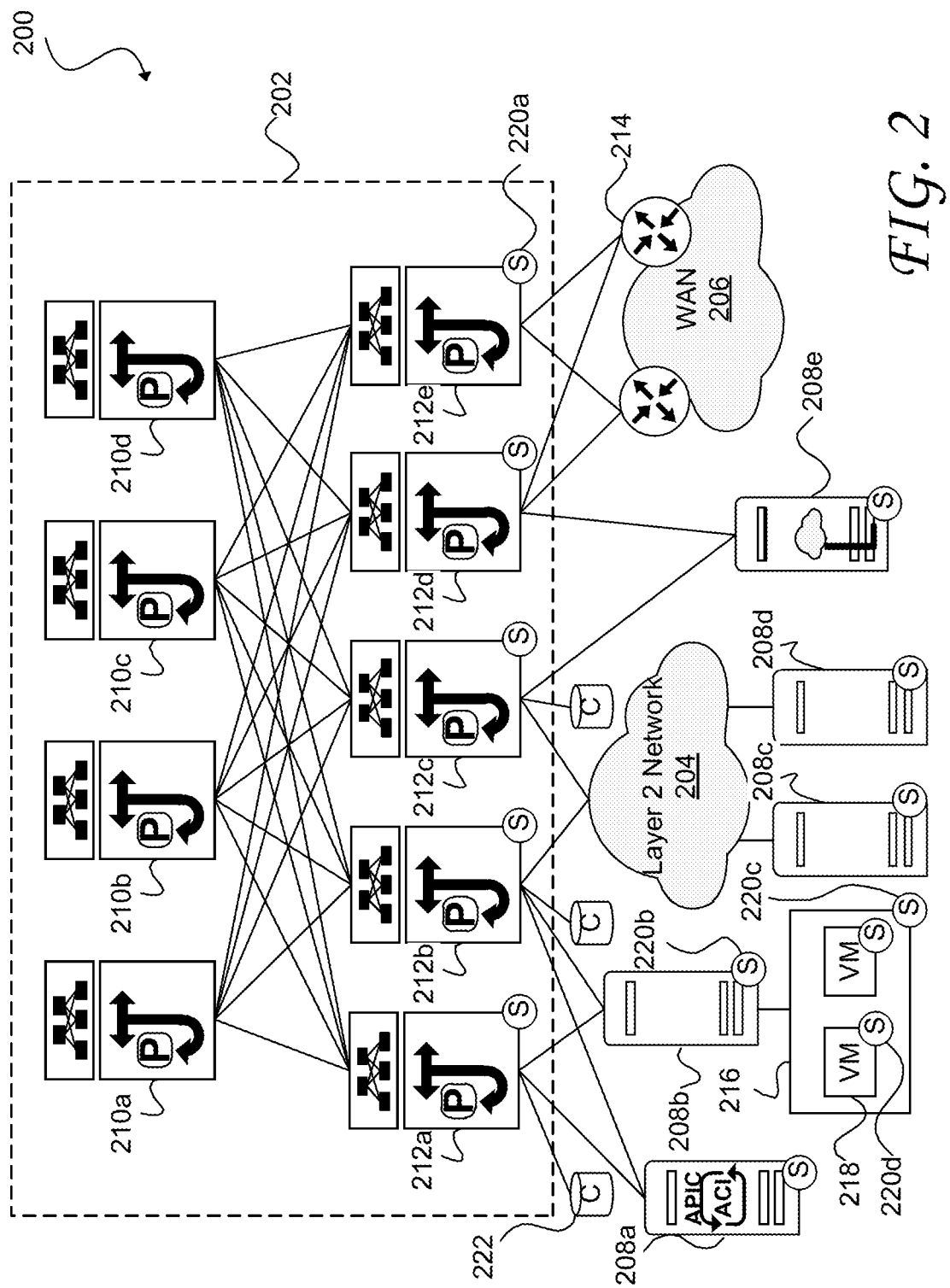
FIG. 2 illustrates an example network environment in which a clustering and query generation techniques of the subject technology may be implemented.

FIG. 2 illustrates an example of a network environment 200 in accordance with an embodiment. In some embodiments, a network traffic monitoring system, such as the network traffic monitoring system 100 of FIG. 1, can be implemented in the network environment 200. It should be understood that, for the network environment 200 and any environment discussed herein, there can be additional or fewer nodes, devices, links, networks, or components in similar or alternative configurations. Embodiments with different numbers and/or types of clients, networks, nodes, cloud components, servers, software components, devices, virtual or physical resources, configurations, topologies, services, appliances, deployments, or network devices are also contemplated herein. Further, the network environment 200 can include any number or type of resources, which can be accessed and utilized by clients or tenants. The illustrations and examples provided herein are for clarity and simplicity.

Network environment 200 can include a network fabric 202, a Layer 2 (L2) network 204, a Layer 3 (L3) network 206, and servers 208a, 208b, 208c, 208d, and 208e (collectively, 208). The network fabric 202 can include spine switches 210a, 210b, 210c, and 210d (collectively, "210") and leaf switches 212a, 212b, 212c, 212d, and 212e (collectively, "212"). The spine switches 210 can connect to the leaf switches 212 in the network fabric 202. The leaf switches 212 can include access ports (or non-fabric ports) and fabric ports. The fabric ports can provide uplinks to the spine switches 210, while the access ports can provide connectivity to endpoints (e.g., the servers 208), internal networks (e.g., the L2 network 204), or external networks (e.g., the L3 network 206).

Leaf switches 212 can reside at the edge of the network fabric 202, and can thus represent the physical network edge. For instance, in some embodiments, the leaf switches 212d and 212e operate as border leaf switches in communication with edge devices 214 located in the external network 206. The border leaf switches 212d and 212e may be used to connect any type of external network device, service (e.g., firewall, deep packet inspector, traffic monitor, load balancer, etc.), or network (e.g., the L3 network 206) to the fabric 202.

Although the network fabric 202 is illustrated and described herein as an example leaf-spine architecture, one of ordinary skill in the art will readily recognize that various embodiments can be implemented based on any network topology, including any data center or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. Thus, in some embodiments, the leaf switches 212 can be top-of-rack switches configured according to a top-of-rack architecture. In other embodiments, the leaf switches 212 can be aggregation switches in any particular topology, such as end-of-row or middle-of-row topologies. In some embodiments, the leaf switches 212 can also be implemented using aggregation switches.

Moreover, it is understood that the topology illustrated in FIG. 2 is readily scalable and can accommodate a large number of components, as well as more complicated arrangements and configurations. For example, the network may include any number of fabrics 202, which may be geographically dispersed or located in the same geographic area. Thus, network nodes may be used in any suitable network topology, which may include any number of servers, virtual machines or containers, switches, routers, appliances, controllers, gateways, or other nodes interconnected to form a large and complex network. Nodes may be coupled to other nodes or networks through one or more interfaces employing any suitable wired or wireless connection, which provides a viable pathway for electronic communications.

Network communications in the network fabric 202 can flow through the leaf switches 212. In some embodiments, the leaf switches 212 can provide endpoints (e.g., the servers 208), internal networks (e.g., the L2 network 204), or external networks (e.g., the L3 network 206) access to the network fabric 202, and can connect the leaf switches 212 to each other. In some embodiments, the leaf switches 212 can connect endpoint groups (EPGs) to the network fabric 202, internal networks (e.g., the L2 network 204), and/or any external networks (e.g., the L3 network 206). EPGs are groupings of applications, or application components, and tiers for implementing forwarding and policy logic. EPGs can allow for separation of network policy, security, and forwarding from addressing by using logical application boundaries. EPGs can be used in the network environment 200 for mapping applications in the network. For example, EPGs can comprise a grouping of endpoints in the network indicating connectivity and policy for applications.

As discussed, the servers 208 can connect to the network fabric 202 via the leaf switches 212. For example, the servers 208a and 208b can connect directly to the leaf switches 212a and 212b, which can connect the servers 208a and 208b to the network fabric 202 and/or any of the other leaf switches. The servers 208c and 208d can connect to the leaf switches 212b and 212c via the L2 network 204. The servers 208c and 208d and the L2 network 204 make up a local area network (LAN). LANs can connect nodes over dedicated private communications links located in the same general physical location, such as a building or campus.

WAN 206 can connect to the leaf switches 212d or 212e via the L3 network 206. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. The endpoints 208 can include any communication device or component, such as a computer, server, blade, hypervisor, virtual machine, container, process (e.g., running on a virtual machine), switch, router, gateway, host, device, external network, etc.

In some embodiments, the network environment 200 also includes a network controller running on the host 208a. The network controller is implemented using the Application Policy Infrastructure Controller (APIC™) from Cisco®. The APIC™ provides a centralized point of automation and management, policy programming, application deployment, and health monitoring for the fabric 202. In some embodiments, the APIC™ is operated as a replicated synchronized clustered controller. In other embodiments, other configurations or software-defined networking (SDN) platforms can be utilized for managing the fabric 202.

In some embodiments, a physical server 208 may have instantiated thereon a hypervisor 216 for creating and running one or more virtual switches (not shown) and one or more virtual machines 218, as shown for the host 208b. In other embodiments, physical servers may run a shared kernel for hosting containers. In yet other embodiments, the physical server 208 can run other software for supporting other virtual partitioning approaches. Networks in accordance with various embodiments may include any number of physical servers hosting any number of virtual machines, containers, or other virtual partitions. Hosts may also comprise blade/physical servers without virtual machines, containers, or other virtual partitions, such as the servers 208a, 208c, 208d, and 208e.

Network environment 200 can also integrate a network traffic monitoring system, such as the network traffic monitoring system 100 shown in FIG. 1. For example, the network traffic monitoring system of FIG. 2 includes sensors 220a, 220b, 220c, and 220d (collectively, "220"), collectors 222, and an analytics engine, such as the analytics engine 110 of FIG. 1, executing on the server 208e. The analytics engine 208e can receive and process network traffic data collected by the collectors 222 and detected by the sensors 220 placed on nodes located throughout the network environment 200. Although the analytics engine 208e is shown to be a standalone network appliance in FIG. 2, it will be appreciated that the analytics engine 208e can also be implemented as a virtual partition (e.g., VM or container) that can be distributed onto a host or cluster of hosts, software as a service (SaaS), or other suitable method of distribution. In some embodiments, the sensors 220 run on the leaf switches 212 (e.g., the sensor 220a), the hosts 208 (e.g., the sensor 220b), the hypervisor 216 (e.g., the sensor 220c), and the VMs 218 (e.g., the sensor 220d). In other embodiments, the sensors 220 can also run on the spine switches 210, virtual switches, service appliances (e.g., firewall, deep packet inspector, traffic monitor, load balancer, etc.) and in between network elements.

In some embodiments, sensors 220 can be located at each (or nearly every) network component to capture granular packet statistics and data at each hop of data transmission. In other embodiments, the sensors 220 may not be installed in all components or portions of the network (e.g., shared hosting environment in which customers have exclusive control of some virtual machines). As shown in FIG. 2, a host may include multiple sensors 220 running on the host (e.g., the host sensor 220b) and various components of the host (e.g., the hypervisor sensor 220c and the VM sensor 220d) so that all (or substantially all) packets traversing the network environment 200 may be monitored. For example, if one of the VMs 218 running on the host 208b receives a first packet from the WAN 206, the first packet may pass through the border leaf switch 212d, the spine switch 210b, the leaf switch 212b, the host 208b, the hypervisor 216, and the VM. Since all or nearly all of these components contain a respective sensor, the first packet will likely be identified and reported to one of the collectors 222. As another example, if a second packet is transmitted from one of the VMs 218 running on the host 208b to the host 208d, sensors installed along the data path, such as at the VM 218, the hypervisor 216, the host 208b, the leaf switch 212b, and the host 208d will likely result in capture of metadata from the second packet.

Figure 3:
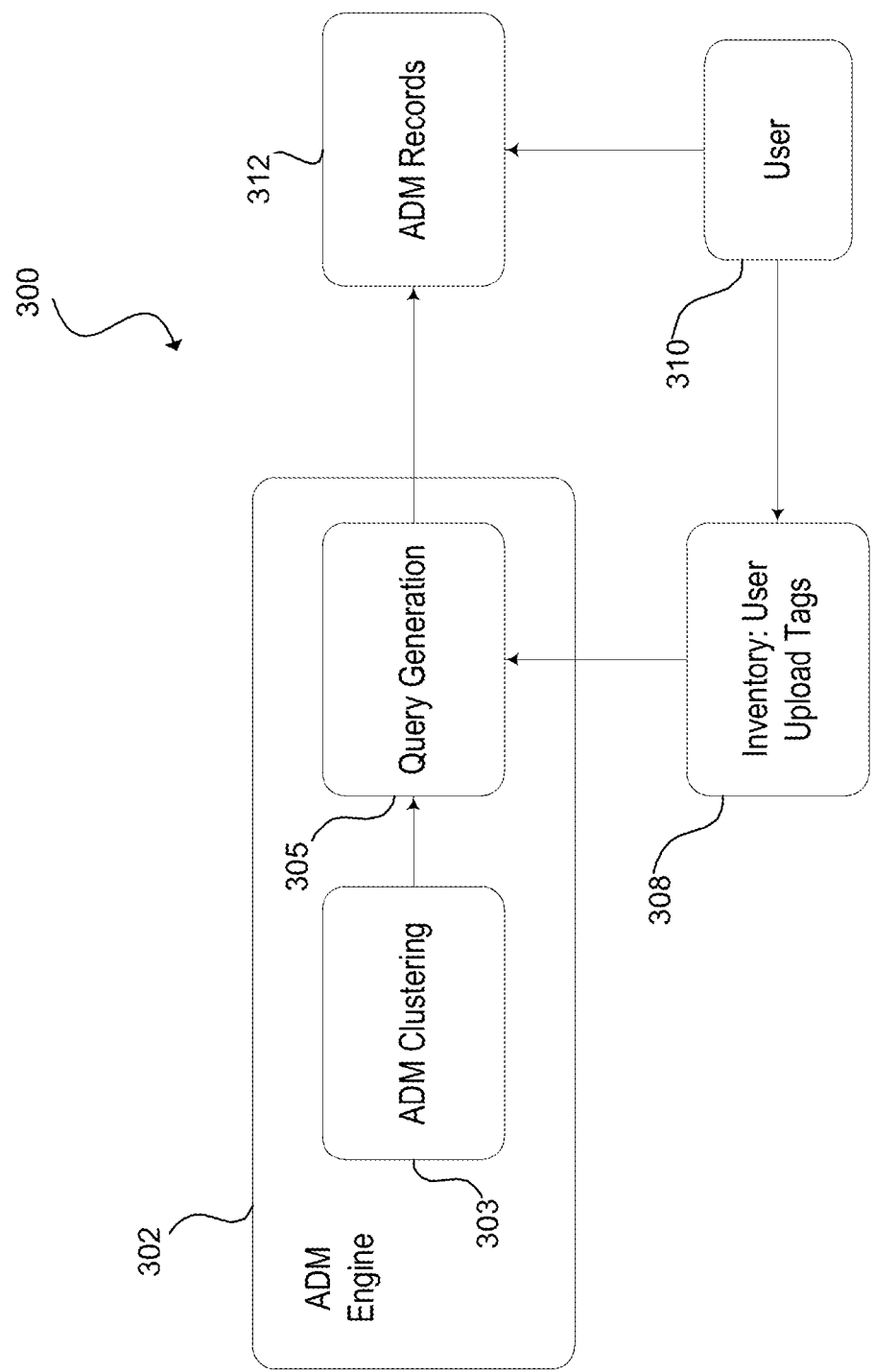
FIG. 3 illustrates an example system architecture for implementing an automatic network device (endpoint) grouping process of the disclosed technology.
Figure 4:
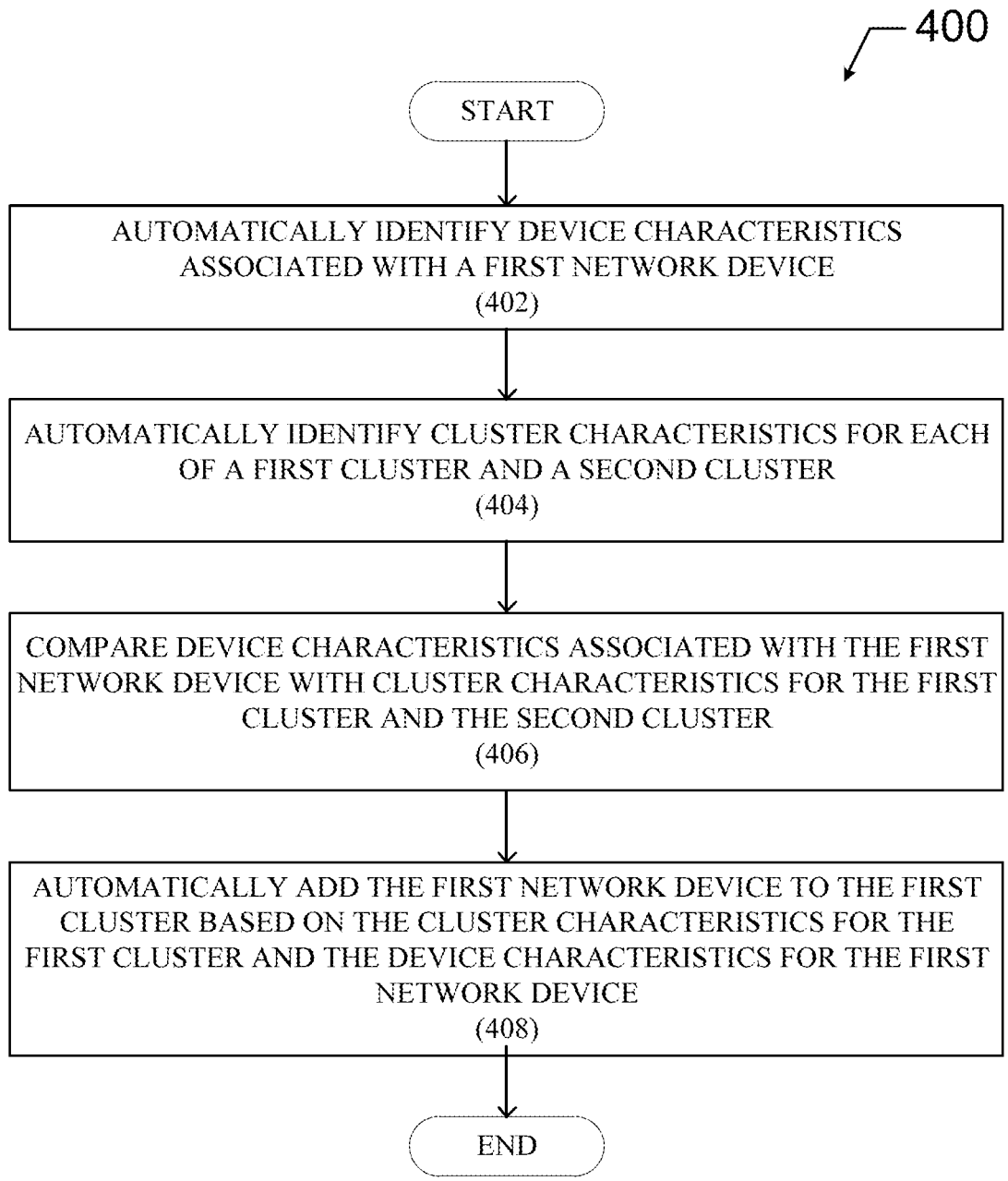
FIG. 4 illustrates a process for performing cluster updates and query generation, according to some aspects of the technology.

FIG. 3 illustrates an example system 300 for implementing an automatic network device (endpoint) clustering process of the disclosed technology. System 300 includes ADM engine 302 that is configured to perform endpoint clustering and generate ADM records 312, based on provided inputs, e.g., tags and associations provided by a user 310 using an inventory process 308. It is understood that system 300 represents a simplified architecture for implementing an automated cluster management technique of the disclosed technology.

As illustrated, ADM engine 302 includes clustering module 303 and query generation module 305. Clustering module 303 can be configured to receive network updates and/or monitor network traffic to detect changes in network device and/or cluster characteristics, and to perform automatic clustering updates/assignments. As mentioned above, and discussed in further detail below with respect to FIG. 4, ADM engine 302, using clustering module 303, can be configured to implement a machine learning classification approach to the management of cluster membership.

Outputs from clustering module 303 are then provided to query generation model 305, which is configured to construct queries uniquely identifying various endpoint groups. Queries can include strings of endpoint characteristics such as characteristics representing shared attributes of all endpoints in a particular cluster. As discussed above, tags can be used to identify hosts (e.g., by name, and/or IP address), virtual partition information, process information, operating system (OS) information, tenant information, application information, network topology characteristics, cluster membership, and/or application dependencies, and the like.

In some implementations, query generation is informed by user input. For example, user 310 can manually input/select tags to be associated with a given cluster (and therefore query), which can then be provided to query generation module 305 via inventory module 308. In some aspects, user editing of cluster tags can cause the manual inclusion (or removal) of one or more endpoints from a given cluster. That is, user inputs may be used to override endpoint classification decisions made by the machine learning model. A more detailed description of an automated endpoint clustering management process is discussed with respect to FIG. 4, below Specifically, FIG. 4 illustrates a process 400 for performing cluster updates and query generation, according to some aspects of the technology. Process 400 can be implemented using the network infrastructure described with respect to system 300, discussed above. Process 400 begins with the automatic detection and identification of one or more device characteristics associated a first network device (step 402). As mentioned, the first network device can be any virtual or physical device in the network. By way of example, first network device may be a host/network endpoint.

In some aspects, the first network device may be a new device, such as a physical host or newly instantiated virtual machine or container process. In other aspects, the first network device may be a legacy device with changing characteristics, for example, which changes to one or more attributes associated with a label/tag.

Next, one or more cluster characteristics are identified for each of a variety of pre-existing endpoint clusters (step 404). By way of example, cluster characteristics can be identified for at least 2 different clusters, i.e., a first cluster and a second cluster representing pre-existing endpoint groups. In some approaches, cluster characteristics for the respective first cluster and the second cluster represent common characteristics shared by their respective endpoint members. Cluster characteristics for the first cluster and the second cluster can be represented by tags as well as queries that uniquely identify each cluster based on its characteristics and/or shared characteristics of the associated member devices.

Once characteristics have been identified for the pre-existing clusters, process 400 proceeds to step 406 in which device characteristics associated with the first network device are compared with the cluster characteristics for the first cluster and the second cluster. Comparisons between device characteristics and cluster characteristics can be performed using a machine learning approach. For example, device characteristics of the first network device may be represented by a vector that is provided as an input to machine learning classifier configured to evaluate a distance of the input vector from pre-existing cluster characteristic vectors in a (characteristic) vector space.

After the machine learning classifier determines the closest cluster characteristic vector to the device characteristic vector (input), the first network device is automatically added to the corresponding cluster. By way of example first network device can be automatically added to the first cluster based on similarities between cluster characteristics for the first cluster and the device characteristics for the first network device.

As discussed above, automated cluster management techniques can also be applied for endpoint/host network devices that are already assigned to a cluster. For example, changing device characteristics may result in a scenario where a given network device's characteristics are significantly different from that of other devices in the same cluster/group. In such instances, the device may be removed from a group and/or re-assigned to another cluster.

In other examples, a newly formed cluster may provide characteristics that more closely match those of devices belonging to another group. Such changes can also trigger cluster updates. As understood by those of skill in the art, the cluster update process may be triggered by a variety of factors, including but not limited to: detected changes in the network, such as, detected changes to one or more network devices, existing clusters, network policies, network topology, and the like. Additionally, cluster updates may be performed on a predetermined schedule such as at periodic time intervals i.e., every 1 minute, every 5 minutes, or every day at a certain pre-specified time e.g. at midnight.

In some implementations, changes to cluster membership can trigger changes to associated queries, for example, that provide labels/tags representing characteristics of the associated cluster. By automatically updating queries, the system provides a convenient and automatically managed process that enables users/system administrators to identify and select a given cluster based on its associated query. As discussed above, query management may be facilitated by a graphical user interface (GUI) that enables the user to easily view, search, and select queries associated with different network/device characteristics.

Figure 5:
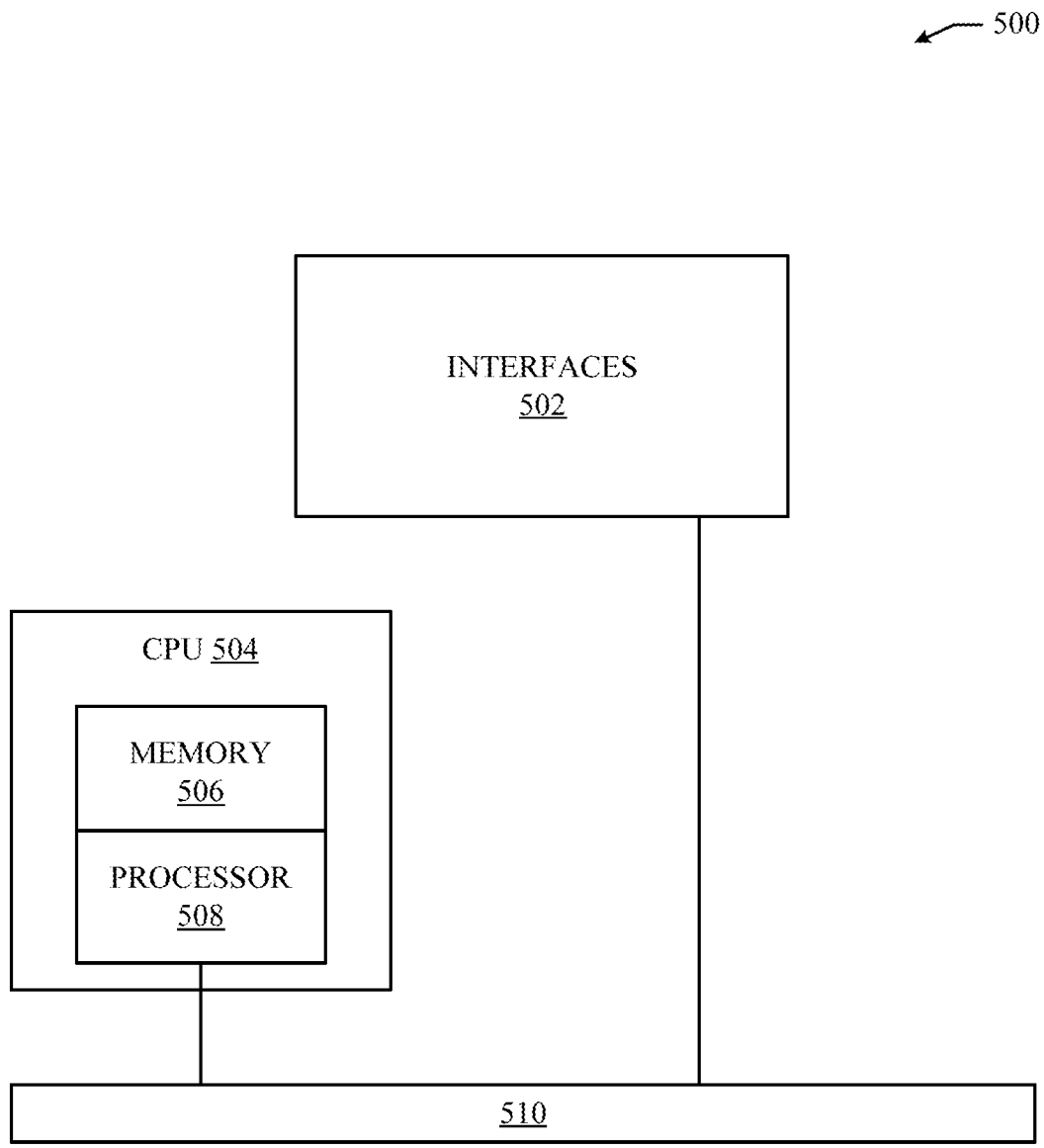
FIG. 5 illustrate example network device that can be used to implement some aspects of the disclosed technology.

FIG. 5 illustrates an example network device 500 suitable for implementing various aspects of an automatic clustering process of the disclosed technology. Network device 500 includes a central processing unit (CPU) 504, interfaces 502, and a bus 510 (e.g., a PCI bus). When acting under the control of appropriate software or firmware, the CPU 504 is responsible for executing packet management, error detection, and/or routing functions. CPU 504 preferably accomplishes all these functions under the control of software including an operating system and any appropriate applications software. CPU 504 may include one or more processors 508, such as a processor from the INTEL X86 family of microprocessors. In some cases, processor 508 can be specially designed hardware for controlling the operations of network device 500. In some cases, a memory 506 (e.g., non-volatile RAM, ROM, etc.) also forms part of CPU 504. However, there are many different ways in which memory could be coupled to the system.

Interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 504 to efficiently perform routing computations, network diagnostics, security functions, etc.

Although the system shown in FIG. 5 is one specific network device of the present subject matter, it is by no means the only network device architecture on which the present subject matter can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC), which can be configured to perform routing and/or switching operations. The ASIC can communicate with other components in the network device 500 via the bus 510, to exchange data and signals and coordinate various types of operations by the network device 500, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

What is claimed is:

1. A system, comprising:
   one or more processors; and
   at least one memory comprising instructions stored therein, which when executed by the one or more processors, cause the one or more processors to perform operations comprising:
   identifying one or more device characteristics associated with a first network device in a network environment;
   identifying one or more first common characteristics of each member of a first cluster and one or more second common characteristics of each different member of a second cluster, at least one of the one or more first common characteristics being different than the one or more second common characteristics;
   generating one or more first query terms that identify the first cluster based on the one or more first common characteristics and one or more second query terms that identify the second cluster based on the one or more second common characteristics, wherein the one or more first query terms uniquely distinguish the first cluster from the second cluster, and wherein the one or more second query terms uniquely distinguish the second cluster from the first cluster;
   comparing the device characteristics associated with the first network device with the one or more first query terms and the one or more second query terms through a machine-learning model trained to evaluate variation between network device characteristics of network devices and changing cluster characteristics of changing clusters of network devices and segment the network devices into one or more of the changing clusters of network devices based on the variation between the network device characteristics of the network devices and the changing cluster characteristics of the changing clusters of network devices, wherein the changing cluster characteristics vary during operating of the network environment to dynamically define the changing clusters of network devices; and
   adding the first network device to the first cluster based on a match between the one or more device characteristics associated with the first network device and the one or more first query terms associated with the first cluster.

2. The system of claim 1, wherein the at least one memory includes instructions which, when executed by the one or more processors, cause the one or more processors to perform operations comprising:
   detecting a change to one or more device characteristics associated with a second network device, wherein the second network device is a member of the second cluster; and
   removing the second network device from the second cluster based on the change to the one or more device characteristics associated with the second network device.

3. The system of claim 1, wherein the one or more first query terms comprise one or more labels that describe at least one of the one or more first common characteristics associated with the first cluster.

4. The system of claim 3, wherein the one or more first query terms include a user selectable Boolean expression that uniquely identifies the first cluster.

5. The system of claim 1, wherein the device characteristics associated with the first network device comprises one or more of: names, labels, metadata tags, or key value pairs.

6. The system of claim 1, wherein identifying the one or more one or more first common characteristics of each member of the first cluster and one or more second common characteristics of each member of the second cluster is automatically performed at periodic intervals.

7. A computer-implemented method comprising:
   identifying one or more device characteristics associated with a first network device;
   identifying one or more first common characteristics of each member of a first cluster and one or more second common characteristics of each different member of a second cluster, at least one of the one or more first common characteristics being different than the one or more second common characteristics;
   generating one or more first query terms that identify the first cluster based on the one or more first common characteristics and one or more second query terms that identify the second cluster based on the one or more second common characteristics, wherein the one or more first query terms uniquely distinguish the first cluster from the second cluster, and wherein the one or more second query terms uniquely distinguish the second cluster from the first cluster;
   comparing the device characteristics associated with the first network device with the one or more first query terms and the one or more second query terms cluster through a machine-learning model trained to evaluate variation between network device characteristics of network devices and changing cluster characteristics of changing clusters of network devices and segment the network devices into one or more of the changing clusters of network devices based on the variation between the network device characteristics of the network devices and the changing cluster characteristics of the changing clusters of network devices, wherein the changing cluster characteristics vary during operating of the network environment to dynamically define the changing clusters of network devices; and adding the first network device to the first cluster based on a match between the one or more device characteristics associated with the first network device and the one or more first query terms associated with the first cluster.

8. The computer-implemented method of claim 7, further comprising:
   detecting a change to one or more device characteristics associated with a second network device, wherein the second network device is a member of the second cluster; and
   removing the second network device from the second cluster based on the change to the one or more device characteristics associated with the second network device.

9. The computer-implemented method of claim 7, wherein the one or more first query terms comprise one or more labels that describe at least one of the one or more first common characteristics associated with the first cluster.

10. The computer-implemented method of claim 9, wherein the one or more first query terms include a user selectable Boolean expression that uniquely identifies the first cluster.

11. The computer-implemented method of claim 7, wherein the device characteristics associated with the first network device comprises one or more of: names, labels, metadata tags, or key value pairs.

12. The computer-implemented method of claim 7, wherein identifying the one or more first common characteristics of each member of the first cluster and one or more second common characteristics of each member of the second cluster is automatically performed at periodic intervals.

13. A non-transitory computer-readable storage medium comprising instructions stored therein, which when executed by one or more processors, cause the one or more processors to perform operations comprising:
   identifying one or more device characteristics associated with a first network device;
   identifying one or more first common characteristics of each member of a first cluster and one or more second common characteristics of each different member of a second cluster, at least one of the one or more first common characteristics being different than the one or more second common characteristics;
   generating one or more first query terms that identify the first cluster based on the one or more first common characteristics and one or more second query terms that identify the second cluster based on the one or more second common characteristics, wherein the one or more first query terms uniquely distinguish the first cluster from the second cluster, and wherein the one or more second query terms uniquely distinguish the second cluster from the first cluster;
   comparing the device characteristics associated with the first network device with the one or more first query terms and the one or more second query terms through a machine-learning model trained to evaluate variation between network device characteristics of network devices and changing cluster characteristics of changing clusters of network devices and segment the network devices into one or more of the changing clusters of network devices based on the variation between the network device characteristics of the network devices and the changing cluster characteristics of the changing clusters of network devices, wherein the changing cluster characteristics vary during operating of the network environment to dynamically define the changing clusters of network devices; and
   adding the first network device to the first cluster based on a match between the one or more device characteristics associated with the first network device and the one or more first query terms associated with the first cluster.

14. The non-transitory computer-readable storage medium of claim 13, wherein the one or more processors are further configured to perform operations comprising:
   detecting a change to one or more device characteristics associated with a second network device, wherein the second network device is a member of the second cluster; and
   removing the second network device from the second cluster based on the change to the one or more device characteristics associated with the second network device.

15. The non-transitory computer-readable storage medium of claim 13, wherein the one or more first query terms comprise one or more labels that describe at least one of the one or more first common characteristics associated with the first cluster.

16. The non-transitory computer-readable storage medium of claim 15, the one or more first query terms include a user selectable Boolean expression that uniquely identifies the first cluster.

17. The non-transitory computer-readable storage medium of claim 13, wherein the device characteristics associated with the first network device comprises one or more of: names, labels, metadata tags, or key value pairs.

18. The non-transitory computer-readable storage medium of claim 13, wherein the one or more one or more first common characteristics of each member of the first cluster and one or more second common characteristics of each member of the second cluster are automatically identified at periodic intervals.

19. The system of claim 1, wherein the one or more first query terms are generated, at least in part, based on user input.

20. The system of claim 1, wherein the instructions, which when executed by the one or more processors, further cause the one or more processors to perform operations comprising enforcing one or more policies in the network environment based, at least in part, on a first group of network devices segmented into the first cluster and a second group of network devices segmented into the second cluster.

* * * * *